(12) United States Patent
Fujii et al.

(10) Patent No.: US 10,908,321 B2
(45) Date of Patent: Feb. 2, 2021

(54) GLASS LAMINATE, FRONT PLATE FOR DISPLAY, AND DISPLAY DEVICE

(71) Applicant: AGC Inc., Chiyoda-ku (JP)

(72) Inventors: Kensuke Fujii, Tokyo (JP); Michinori Suehara, Tokyo (JP); Kazunari Tohyama, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/582,152

(22) Filed: Sep. 25, 2019

(65) Prior Publication Data
US 2020/0103559 A1 Apr. 2, 2020

(30) Foreign Application Priority Data

Oct. 1, 2018 (JP) ................ 2018-186454

(51) Int. Cl.
*G02B 1/115* (2015.01)
*B32B 17/10* (2006.01)
*C03C 17/36* (2006.01)
*G02B 5/28* (2006.01)

(52) U.S. Cl.
CPC ........ *G02B 1/115* (2013.01); *B32B 17/10036* (2013.01); *C03C 17/36* (2013.01); *G02B 5/282* (2013.01)

(58) Field of Classification Search
None
See application file for complete search history.

(56) References Cited

U.S. PATENT DOCUMENTS

2015/0138638 A1* 5/2015 Mashimo ............ C03C 17/3435
359/513
2017/0197875 A1 7/2017 Fujii et al.

FOREIGN PATENT DOCUMENTS

JP 2017-125876 A 7/2017

* cited by examiner

*Primary Examiner* — Thien F Tran
(74) *Attorney, Agent, or Firm* — Oblon, McClelland, Maier & Neustadt, L.L.P.

(57) ABSTRACT

A glass laminate includes a glass substrate including a first main surface and a second main surface, and a functional layer at least on the first main surface. The functional layer includes at least two layers having a refractive index different from each other and the at least two layers are alternately laminated. The functional layer includes an outermost layer farthest from the glass substrate and a second layer that is adjacent to the outermost layer and lies closer to the glass substrate than the outermost layer. The outermost layer includes $SiO_2$ as a main component. The second layer has a carbon concentration of $3\times10^{18}$ atoms/cm$^3$ or more and $5\times10^{19}$ atoms/cm$^3$ or less, and the carbon concentration of the second layer is lower than that of the outermost layer.

12 Claims, 4 Drawing Sheets

GLASS LAMINATE, FRONT PLATE FOR DISPLAY, AND DISPLAY DEVICE

CROSS-REFERENCE TO RELATED APPLICATIONS

This application claims priority from Japanese Patent Application No. 2018-186454 filed on Oct. 1, 2018, the entire subject matter of which is incorporated herein by reference.

BACKGROUND OF INVENTION

Technical Field

The present invention relates to a glass laminate, a front plate for display, and a display device.

Background Art

A cover glass is commonly used as a front plate of a touch panel or a display panel that are used in display devices, such as a smart phone, a tablet PC, and a car navigation device. As such a cover glass, Patent Literature 1 discloses a glass laminate including, as a functional layer, an antireflection layer (adhesion layer) formed on one main surface of a glass substrate.

In the related art as in Patent Literature 1, $SiO_2$ is included as a main component of the outermost layer of the antireflection layer, and a carbon concentration is regulated to $5 \times 10^{18}$ to $5 \times 10^{19}$ atoms/cm$^3$; however, Patent Literature 1 is not intended to improve the antireflection layer.

Patent Literature 1: JP 2017-125876 A

SUMMARY OF INVENTION

In view of the foregoing, the improvement in durability of the antireflection layer itself is desired.

An object of the present invention is to provide a glass laminate that is able to improve durability of the functional layer, a front plate for display, and a display device.

The glass laminate in the present invention includes:

a glass substrate including a first main surface and a second main surface; and a functional layer at least on the first main surface, the functional layer including at least two layers having a refractive index different from each other, the at least two layers being alternately laminated, and the functional layer includes an outermost layer farthest from the glass substrate, the outermost layer including $SiO_2$ as a main component, and the functional layer includes a second layer that is adjacent to the outermost layer and lies closer to the glass substrate than the outermost layer, the second layer having a carbon concentration of $3 \times 10^{18}$ atoms/cm$^3$ or more and $5 \times 10^{19}$ atoms/cm$^3$ or less, and the carbon concentration of the second layer is lower than a carbon concentration of the outermost layer.

In the present invention, it is considered that, in the case where the carbon concentration of the second layer of the functional layer is allowed to fall within the above-described range and is made lower than the carbon concentration of the outermost layer, even if the outermost layer is scratched, the following phenomenon occurs, whereby propagation of the scratches up to the second layer is prevented, and durability of the functional layer is improved. That is, though it is common that $SiO_2$ of the outermost layer generally has a high compressive stress, in order to relax the compressive stress based on $SiO_2$, the second layer is required to have a low compressive stress or tensile stress. Thus, the stress budget of the film is stabilized (becomes small), and propagation of the scratches and enlargement of scratches due to peeling between films can be prevented from occurring. As a method for decreasing the film stress, it was generally common to increase the pressure during deposition or to perform deposition with a low energy, and such a method was in a trade-off relation with easy generation of scratches of the film itself. Under such circumstances, the present inventors have found that, by adding a very small amount of carbon to the second layer, the stress of the second film is efficiently decreased, and also found that both relaxation of the stress and prevention of easy generation of scratches can be achieved.

In the glass laminate, it is preferred that the functional layer includes at least one low refractive index layer and at least one high refractive index layer having a refractive index higher than the low refractive index layer, and the layer number of the low refractive index layer is 1 or more and 6 or less and the layer number of the high refractive index layer is same as the layer number of the low refractive index layer.

Though the layer number of the low refractive index layers and the high refractive index layers each constituting the functional layer is not limited, the above-described layer number is preferred from the standpoint of achieving the function as an antireflection layer.

In the glass laminate, it is preferred that: the layer number of each of the low refractive index layer and the high refractive index layer is 1;

the outermost layer is the low refractive index layer; and the high refractive index layer includes, as a main component, any one of $SiN$, $TiO_2$, $Nb_2O_5$, $Ta_2O_5$, and $ZrO_2$.

In this embodiment, when such a material is used, reflectance can be effectively prevented from occurring even by the film structure including only one low refractive index layer and only one high refractive index layer.

In the glass laminate, it is preferred that: the layer number of each of the low refractive index layer and the high refractive index layer is 2 or more and 6 or less;

the outermost layer is one layer of the low refractive index layers;

each of the high refractive index layers includes, as a main component, any one of $SiN$, $TiO_2$, $Nb_2O_5$, $Ta_2O_5$, and $ZrO_2$; and the main component of all of the high refractive index layers is the same, or the main component of at least one layer of the high refractive index layers is different from the main component of the other high refractive index layer(s).

In this embodiment, by using such a main component of these high refractive index layers, the desired antireflection properties can be realized in a relatively small layer number of the low refractive index layers and the high refractive index layers.

The glass laminate preferably further includes an antifouling layer on the outermost layer.

In this embodiment, even when fingers or the like of a human touch the glass laminate, stains by fingerprints, sebum, sweat or the like are difficult to be adhered to the glass laminate by virtue of the antifouling layer, and even when stains are adhered to the glass laminate, the stains can be easily removed. Accordingly, a difference in scattering or reflection of light between the part to which stains are adhered and the part to which stains are not adhered is reduced. As a result, visibility or beauty is not impaired.

In the glass laminate, it is preferred that the antifouling layer is formed of a fluorine-based silane coupling material.

In this embodiment, an excellent antifouling performance can be achieved.

In the glass laminate, it is preferred that the carbon concentration of the outermost layer is $5 \times 10^{18}$ atoms/cm$^3$ or more and $6 \times 10^{19}$ atoms/cm$^3$ or less.

In this embodiment, when the carbon atom concentration in the outermost layer of the functional layer is controlled, the functional layer and the antifouling film are strongly adhered to each other, and abrasion resistance of the antifouling layer is improved.

In the glass laminate, it is preferred that the first main surface of the glass substrate has an antiglare layer.

In this embodiment, the main surface of the glass substrate has an antiglare layer, and as a result, reflection or glare of the glass substrate can be prevented from occurring.

In the glass laminate, it is preferred that: the functional layer includes a main surface that does not face the glass substrate, the main surface having a concave-convex shape; and the concave-convex shape has a root mean square roughness (RMS) of 10 nm or more and 1,000 nm or less.

In this embodiment, reflection or glare of the glass substrate can be effectively prevented from occurring.

In the glass laminate, it is preferred that the outermost layer includes Al—SiO$_2$.

In this embodiment, in the case where the outermost layer is formed from Al—SiO$_2$, a deposition rate during deposition, such as sputtering, is improved, and abnormal discharge (arcing) generated during sputtering can be avoided. As a result, productivity is improved.

The front plate for display in the present invention includes the above-described glass laminate.

In this embodiment, the front plate for display bringing about the above-described effects can be provided.

The display device in the present invention includes the above-described front plate for display.

In this embodiment, the display device bringing about the above-described effects can be provided.

DESCRIPTION OF EMBODIMENTS

Embodiments of the present invention are hereunder described in detail by reference to the drawings.

[Glass Laminate]
(Schematic Structure of Glass Laminate)

Figure 1:
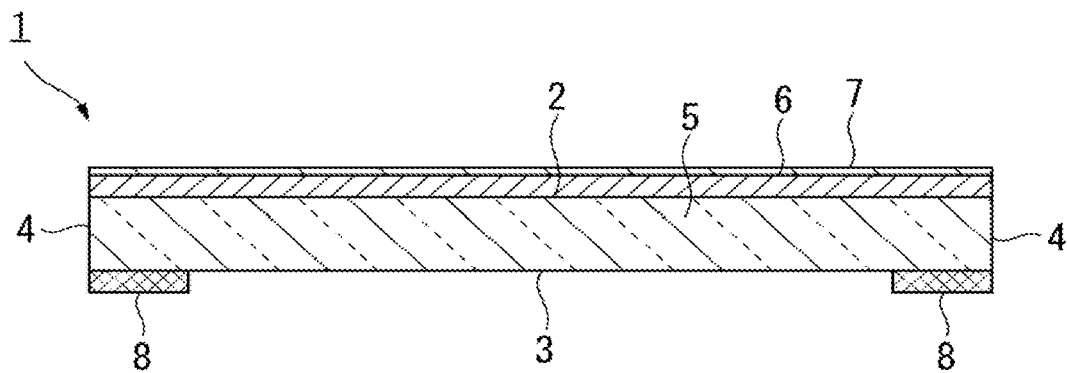
FIG. 1 is a schematic cross-sectional view of a glass laminate in one embodiment of the present invention.

FIG. 1 is a schematic cross-sectional view of a glass laminate.

In FIG. 1, a glass laminate 1 includes a glass substrate 5 including a first main surface 2 and a second main surface 3 that are opposite to each other, and edge surfaces 4 connecting the first main surface 2 and the second main surface 3.

An antireflection layer 6 as a functional layer and an antifouling layer 7 are laminated in this order on/above the first main surface 2 of the glass substrate 5. In addition, the glass laminate 1 further includes a print layer 8 at a periphery of the second main surface 3. The print layer 8 is not essential and is provided as necessary.

(Glass Substrate 5)
(Material)

As the glass substrate 5, for example, a common glass including SiO$_2$ (silicon oxide) as a main component, for example, a glass substrate such as a soda lime silicate glass, an aluminosilicate glass, a borosilicate glass, a non-alkali glass, or a quartz glass may be used.

(Shape)

The shape of the glass substrate 5 used in the glass laminate 1 is not only a flat shape as shown in FIG. 1, but may be a shape having a curved surface as in a glass having at least one bent portion. Recently, in various instruments including an image display device, such as television, personal computers, smart phones, and car navigations, instruments including a curved display surface of an image display device are commercially available.

The glass laminate 1 having a shape that the glass substrate 5 has a curved surface is useful as a glass laminate for such an image display device. For example, when the glass laminate 1 is prepared using a glass having bent portions and having a U-shaped cross section, and the prepared glass laminate is used as a front plate of a mobile phone or the like, the frequency of touch to the glass laminate 1 by users is increased. As a result, the antifouling layer 7 may be gradually peeled, and the effect of preventing adhesion of stains may be decreased. The glass substrate 1 in this embodiment has excellent abrasion resistance and is useful in the above-described uses.

When the glass substrate 5 has a curved surface, the whole surface of the glass substrate 5 may be curved, and the surface of the glass substrate 5 may be constituted of a curved surface part and a flat surface part. Example of the aspect that the whole surface is curved includes an aspect that the cross section of the glass substrate is an arc shape.

When the glass substrate 5 has a curved surface, a radius of curvature (hereinafter sometimes referred to as "R") of the surface can be appropriately set depending on uses of the glass laminate 1, kind of the glass substrate 5, and the like. The radius of curvature is preferably 25,000 mm or less, more preferably 1 mm to 5,000 mm, and especially preferably 5 mm to 3,000 mm. When R is equal to or less than the above-described upper limit, designability is excellent as compared with a flat plate. When R is equal to or more than the above-described lower limit, the antifouling layer 7 can be uniformly formed even on the curved surface.

(Thickness)

The thickness of the glass substrate 5 can be appropriately selected depending on uses. The thickness of the glass substrate 5 is preferably 0.1 mm to 5 mm, more preferably 0.2 mm to 2 mm, and still more preferably 0.5 mm to 2 mm. When the thickness of the glass substrate 5 is 5 mm or less, in the case of applying a chemical strengthening treatment to the glass substrate 5, the treatment can be effectively carried out, and both weight reduction and high strength can be achieved. The thickness of the glass substrate 5 is more preferably 3 mm or less from the standpoint of effectively conducting the chemical strengthening treatment. In addition, when the thickness of the glass substrate 5 is 0.1 mm or more, an excellent strength is obtained when used in a touch panel. When the thickness of the glass substrate 5 is 2 mm or less, excellent sensitivity is obtained when used in a touch panel.

The glass substrate 5 is preferably strengthened by a physical strengthening treatment or a chemical strengthening treatment, and is more preferably strengthened by a chemical strengthening treatment.

The glass substrate 5 having been subjected to a chemical strengthening treatment has, for example, a surface compressive stress (CS) of 450 MPa to 1,200 MPa and a depth of the stress layer (DOL) of 10 μm to 50 μm.

(Imparting of Antiglare Property)

The first main surface 2 of the glass substrate 5 used in the glass laminate 1 preferably has a concave-convex shape for imparting an antiglare property to the glass laminate 1.

The concave-convex shape is formed by, for example, an antiglare treatment and an etching treatment. As to the shape of the first main surface 2 having a concave-convex shape, the surface roughness is preferably 10 nm to 1,500 nm, more preferably 10 nm to 1,000 nm, still more preferably 10 nm to 500 nm, and especially preferably 10 nm to 200 nm in terms of a root mean square roughness (RMS). When RMS falls within the above-described range, a haze value of the first main surface 2 having a concave-convex shape can be adjusted to 3 to 30%, and as a result, an excellent antiglare property can be imparted to the glass laminate 1 obtained. The concave-convex shape for imparting an antiglare property may be formed in the antireflection layer 6 or may be formed in the antifouling layer 7.

(Functional Layer)

The functional layer refers to the antireflection layer 6, a solar reflection film, a dichroic mirror, or the like. Among those, the functional layer preferably refers to the antireflection layer 6.

The functional layer is provided on at least one main surface of the first main surface 2 and second main surface 3 of the glass substrate, preferably provided at least on the first main surface 2, and more preferably provided only on the first main surface 2.

The functional layer is hereunder described while referring to the antireflection layer 6 as an example.

(Antireflection Layer 6)
(Layer Structure)

Figure 2:
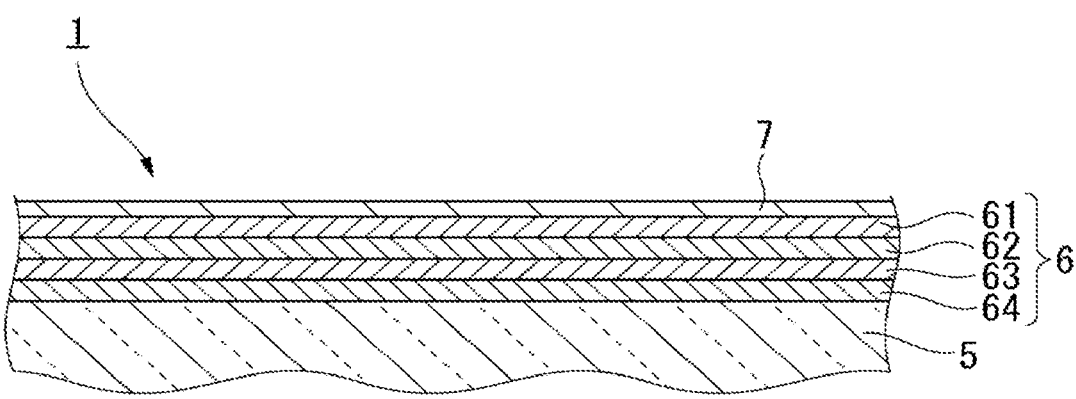
FIG. 2 is a cross-sectional view of a major part of a glass laminate.

FIG. 2 is an enlarged view of the antireflection layer 6.

The antireflection layer 6 is a layer that brings about the effect of reducing a refractive index and reduces glare caused by reflection image of light, and additionally in the case of using in an image display device, the antireflection layer 6 can improve transmittance of light through the image display device and can improve visibility of the image display device.

The structure of the antireflection layer 6 is not particularly limited so long as it is a structure that can reduce reflection of light, and may be, for example, a structure in which high refractive index layer(s) having a refractive index of 1.9 or more at a wavelength of 550 nm and low refractive index layer(s) having a refractive index of 1.6 or less at a wavelength of 550 nm are alternately laminated. Though the layer number of the low refractive index layers and the layer number of the high refractive index layers are not limited, it is preferred that the layer number of the low refractive index layers is 1 or more and 6 or less, and the layer number of the high refractive index layers is same as that of the low refractive index layers. FIG. 2 shows the antireflection layer constituted of two low refractive index layers and two high refractive index layers. In this embodiment, the antireflection layer may be constituted of one low refractive index layer and one high refractive index layer.

In the case where the antireflection layer 6 is constituted of a plurality of the low refractive index layers and a plurality of the high refractive index layers, when a layer farthest from the glass substrate 5 (a layer in contact with the antifouling layer 7) is defined as the outermost layer 61, and layers are counted toward the glass substrate side from the outermost layer 61 being a first layer, odd layers including the outermost layer 61, specifically, the outermost layer 61 and a third layer 63 in FIG. 2, are constituted of the low refractive index layer. When a layer adjacent to the outermost layer 61 and lies closer to the glass substrate than the outermost layer 61 is defined as a second layer 62, even layers including the second layer 62, specifically, the second layer 62 and a fourth layer 64 in FIG. 2, are constituted of the high refractive index layer. The high refractive index layer farthest from the outermost layer 61, specifically the fourth layer 64 in FIG. 2, is in contact with the glass substrate 5.

When the antireflection layer 6 is constituted of one low refractive index layer and one high refractive index layer, the outermost layer 61 is the low refractive index layer, and the second layer 62 is the high refractive index layer.

The antireflection layer 6 has a thickness of 100 nm or more and 600 nm or less, preferably 150 nm or more and 550 nm or less, more preferably 190 nm or more and 510 nm or less, and most preferably 195 nm or more and 506 nm or less.

(Material)

The outermost layer 61 is the low refractive index layer and is preferably a carbon-containing silicon oxide layer containing $SiO_2$ (silicon oxide) as a main component and having a carbon concentration of $5 \times 10^{18}$ atoms/cm$^3$ or more and $6 \times 10^{19}$ atoms/cm$^3$ or less.

The "main component" in this description indicates that the component is contained in an amount of 50% or more in terms of a molar ratio in a layer. The "main component" as referred to herein means that impurities (excluding a carbon atom) may be contained in the silicon oxide. When a carbon atom is not contained, the refractive index of silicon oxide of the outermost layer 61 is generally 1.43 to 1.50. The outermost layer 61 may contain impurities to an extent that the refractive index thereof falls within the range of 1.40 to 1.53, and preferably the range of 1.45 to 1.52.

Since the main component of the outermost layer 61 is a carbon-containing silicon oxide layer in the above-described range, the antifouling layer 7 is strongly intimately adhered to the glass substrate 5 through the antireflection layer 6. As a result, the glass laminate 1 has excellent abrasion resistance.

The thickness of the outermost layer 61 is 60 nm or more and 130 nm or less, preferably 70 nm or more and 100 nm or less, more preferably 75 nm or more and 90 nm or less, and still more preferably 77 nm or more and 88 nm or less. For example, the thickness of the outermost layer 61 is 77 nm, 80 nm, or 88 nm.

Examples of the measurement method of the thickness of the outermost layer 61 include the measurement of an actual thickness by cross-sectional observation based on SEM (scanning electron microscopy) or TEM (transmission electron microscopy), and the optical measurement by ellipsometry. When an antiglare treatment has been applied to the outermost layer 61, the actual thickness is preferably measured using SEM or TEM. In addition, when the refractive index of each layer is known, the thickness can be derived from spectral reflectance or transmittance (reference literature: "Optical thin film and deposition technology", author: Lee, C. C., translator: ULVAC, Inc., published from Agune Technical Center, 2002). In particular, when the refractive index of each layer is known, the thickness is preferably measured based on spectral reflectance.

The measurement method of the thickness can be applied to the measurement of thicknesses of the entire antireflection layer, each layer in the antireflection layer, and the antifouling layer. However, the antifouling layer is very thin. Therefore, the thickness of the antifouling layer is preferably derived by removing a part of the antifouling layer by the method described hereinafter and then seeing a difference by optical measurement (Reference Literature: WO 2016/068112 A, paragraphs [0125] to [0129]).

The third layer 63 may be formed of a material same as or different from the material in the outermost layer 61.

Though the thickness of the third layer 63 is not particularly limited, it is, for example, 35 nm.

Any one layer or all layers of the odd layers including the outermost layer 61 may be made of Al—SiO$_2$ (aluminum-doped silicon oxide) containing silicon oxide doped with aluminum as the main component.

The second layer 62 is a high refractive index layer, and its material is not particularly limited. For example, the main component thereof is preferably at least one selected from SiN (silicon nitride), TiO$_2$ (titanium oxide), Nb$_2$O$_5$ (niobium oxide), Ta$_2$O$_5$ (tantalum oxide), and ZrO$_2$ (zirconium oxide). By using such a material, even in the film structure in which the antireflection layer is constituted of one low refractive index layer and one high refractive index layer, the reflection can be effectively prevented from occurring. Furthermore, of those materials, from the standpoints of productivity and refractive index, silicon nitride, niobium oxide, and tantalum oxide are more preferred, and niobium oxide is especially preferred.

The thickness of the second layer 62 is preferably 15 nm or more and 200 nm or less, preferably 20 nm or more and 150 nm or less, and more preferably 25 nm or more and 115 nm or less. For example, the thickness of the second layer 62 is 25 nm, 100 nm, or 115 nm.

A carbon concentration of the second layer 62 is $3\times10^{18}$ atoms/cm$^3$ or more and $5\times10^{19}$ atoms/cm$^3$ or less, preferably $8\times10^{18}$ atoms/cm$^3$ or more and $4\times10^{19}$ atoms/cm$^3$ or less, and more preferably $8\times10^{18}$ atoms/cm$^3$ or more and $3.4\times10^{19}$ atoms/cm$^3$ or less. The carbon concentration of the second layer 62 is preferably lower than the carbon concentration of the outermost layer 61.

Here, when the carbon concentration of the second layer 62 is less than $3\times10^{18}$ atoms/cm$^3$, stress relaxation of the layer is not thoroughly achieved, and scratches are liable to be propagated. When the carbon concentration of the second layer 62 is more than $5\times10^{19}$ atoms/cm$^3$, while the stress is relaxed, the film itself becomes soft, and as a result, it may be hard to improve the scratch rubbing resistance.

The main component of the even layers of the fourth layer and odd layer(s) following the fourth layer, for example, the fourth layer 64 in FIG. 2, may be formed of niobium oxide as in the second layer 62, or may be a material different from the second layer 62.

Though the carbon concentration of the even layers of the fourth layer and odd layer(s) following the fourth layer is not particularly limited, it is preferably $3\times10^{18}$ atoms/cm$^3$ or more and $5\times10^{19}$ atoms/cm$^3$ or less, more preferably $8\times10^{18}$ atoms/cm$^3$ or more and $4\times10^{19}$ atoms/cm$^3$ or less, and still more preferably $8\times10^{18}$ atoms/cm$^3$ or more and $3.4\times10^{19}$ atoms/cm$^3$ or less.

(Surface Roughness)

The surface roughness of the outermost layer 61 is preferably 3 nm or less, more preferably 2 nm or less, and still more preferably 1.5 nm or less in terms of an arithmetic mean roughness (Ra). When Ra is 3 nm or less, cloth and the like can be deformed along a concave-convex shape of the antifouling layer 7, and a load is nearly uniformly applied to the entire surface of the antifouling layer 7. As a result, it is considered that peeling of the antifouling layer is prevented from occurring, and abrasion resistance is improved.

The arithmetic mean roughness (Ra) is a value obtained by averaging absolute value deviations from a reference plane in a roughness curve included in a reference length on the reference plane. The surface approaches complete smooth surface as Ra approaches 0. Ra can be measured in accordance with the method defined in, for example, JIS B0601: (2001). As the specific measurement method of Ra, specifically, a visual field range of 3 μm×3 μm is set to a measurement surface of the glass substrate 5 after forming an antireflection layer 6 as a sample by a scanning probe microscope (Model: SPA400, manufactured by Seiko Instruments Inc.), and a plane profile of the glass substrate 5 is measured. Ra can be calculated from the plane profile measured.

When measuring the arithmetic mean roughness (Ra) of the antireflection layer, in the case where the first main surface 2 has a concave-convex shape, the measurement region may be set such that the concave-convex shape is not picked up. When the diameter of circular holes and the root mean square roughness (RMS) fall within the above-described preferred ranges, it is possible to measure Ra of the antireflection layer by, for example, setting the measurement region to a region excluding a ridge line of the convex-concave.

When the first main surface 2 of the glass substrate 5 has a concave-convex shape, the root mean square roughness (RMS) of the outermost layer 61 of the antireflection layer 6, the outermost layer 61 being in contact with the antifouling layer 7, is preferably 10 nm or more, and more preferably 20 nm or more in terms of the lower limit, and it is preferably 1,500 nm or less, more preferably 1,000 nm or less, still more preferably 500 nm or less, and especially preferably 200 nm or less in terms of the upper limit. When the RMS falls within the above-described range, peeling of the antifouling layer 7 is prevented, and the abrasion resistance is improved, and in addition to those, both antidazzle property and antiglare property can be achieved. The "dazzle" as referred to herein means the degree that, when the glass substrate having a concave-convex shape in any one of the main surfaces is used in a display front plate of a pixel matrix type display device, many particles of light having a period larger than that of the pixel matrix are observed, and visibility is impaired by this.

In the measurement of RMS of the concave-convex shape, a measurement region may be selected such that many circular holes are sufficiently contained in the measurement region, contrary to the measurement of the arithmetic mean roughness (Ra) of the antireflection layer 6 as described above. In addition, the surface roughness of the antireflection layer 6 and the antifouling layer 7 is sufficiently smooth as described above. Therefore, it may be considered that the value of RMS measured by the above-described method is same as RMS of the concave-convex shape in the state that the antireflection layer 6 and the antifouling layer 7 are present.

The root mean square roughness (RMS) can be measured in accordance with the method defined in JIS B0601: (2001). As the specific measurement method of RMS, specifically, a visual field range of 300 μm×200 μm is set to the measurement surface of the glass substrate 5 after an antiglare treatment as a sample, and height information of the glass substrate 5 is measured by a laser microscope (trade name: VK-9700, manufactured by Keyence Corporation). Cutoff correction is performed to the measurement value, a root mean square of the height obtained is obtained, and RMS can be calculated. The cutoff value is preferably 0.08 mm. A Haze value is a value measured by the definition of JIS K7136: (2000).

When the first main surface 2 having a concave-convex shape is observed from above, circular holes are observed. A size of the circular holes observed, that is, a diameter in terms of a true circle, is preferably 5 μm to 50 μm. When the diameter falls within such a range, it is possible to achieve both antidazzle property and antiglare property of the glass laminate 1.

(Antifouling Layer 7)

The antifouling layer 7 is a layer preventing organic materials or inorganic materials from being adhered to the surface thereof, or a layer bringing about the effect that adherents can be easily removed by cleaning, such as wiping-off, even in the case where organic materials or inorganic materials are adhered to the surface.

Though the thickness of the antifouling layer 7 is not particularly limited, in the case where the antifouling layer 7 includes a fluorine-containing organosilicon compound coating film, the thickness is preferably 2 nm or more and 20 nm or less, preferably 2 nm or more and 15 nm or less, and more preferably 2 nm or more and 10 nm or less. Above all, the thickness is preferably 2 nm or more and 8 nm or less, and more preferably 2 nm or more and 6 nm or less, and it is especially preferably 4 nm.

When the thickness is 2 nm or more, the first main surface 2 of the glass substrate 5 is uniformly covered with the antifouling layer 7, and the glass laminate withstands practical use from the viewpoint of rubbing resistance. When the thickness is 20 nm or less, optical properties, such as a haze value of the glass laminate 1 in the state that the antifouling layer 7 has been formed, are satisfactory.

When the thickness of the antifouling layer 7 is about 2 nm or more and about 20 nm or less, the antifouling layer 7 is thin. Therefore, the concave-convex structure of the surface of the antifouling layer 7 is formed such that the surface shape of the antireflection layer 6 is traced as it is. For this reason, it can be considered that the arithmetic mean roughness (Ra) of the antifouling layer 7 is equal to Ra of the antireflection layer 6. In addition, it can be considered that the root mean square roughness (RMS) of the antifouling layer 7 is equal to RMS of the antireflection layer 6. Therefore, the surface roughness (Ra or RMS) of the antireflection layer 6 can be measured by Ra or RMS of the glass laminate 1 after forming the antifouling layer 7. However, when the first main surface 2 of the glass substrate 5 has a concave-convex shape, the measurement region is preferably selected in such a manner that for example, a fine region of 1 μm×1 μm is selected and measurement is performed such that the concave-convex shape is not measured, in measuring Ra or RMS of the antireflection layer 7.

The antifouling layer 7 may be any material so long as, for example, it has water repellency and oil repellency and can impart antifouling property to the glass laminate 1 obtained. For example, the antifouling layer 7 preferably includes a fluorine-containing organosilicon compound coating film obtained through curing by subjecting a fluorine-containing organosilicon compound including a fluorine-based silane coupling material to a hydrolysis condensation reaction.

The antifouling layer 7 is formed as follows: a fluorine-containing hydrolyzable silicon compound, such as a fluorine-containing organosilicon compound, undergoes the hydrolysis condensation reaction as follows on the surface of the antireflection layer 6 formed on the first main surface 2 of the glass substrate, and has water repellency and oil repellency. In this description, the fluorine-containing hydrolyzable silicon compound means a compound having a hydrolyzable silyl group having a hydrolyzable group or atom bonded to a silicon atom and further having a fluorine-containing organic group to be bonded to the silicon atom. The hydrolyzable group or atom constituting the hydrolyzable silyl group by bonding to the silicon atom is collectively called a "hydrolyzable group".

That is, the hydrolyzable silyl groups of the fluorine-containing hydrolyzable silicon compound convert to silanol groups by hydrolysis, those groups are dehydration condensed between molecules to form a siloxane bond represented by —Si—O—Si—, whereby a fluorine-containing organosilicon compound coating film is formed. In the fluorine-containing organosilicon compound coating film, almost all of the fluorine-containing organic groups bonded to the silicon atom of the siloxane bond are present in the vicinity of the surface of the coating film on the side of the antireflection layer 6, and water repellency and oil repellency can be developed by the action of the fluorine-containing groups. On this occasion, the silanol groups are chemically bonded to hydroxyl groups on the surface of the antireflection layer 6 on the side of the antifouling layer 7, that is a surface on which the antifouling layer 7 is formed, that is, on the surface of a silicon oxide layer, by a dehydration condensation reaction, thereby forming points adhered through the siloxane bond. Thus, in the glass laminate 1, the antifouling layer 7 is strongly adhered to the glass substrate 5 through the antireflection layer 6, and as a result, the glass laminate 1 has excellent antifouling property.

The fluorine-containing hydrolyzable silicon compound is a compound having fluorine-containing organic groups to be bonded to silicon atoms and may be a fluorine-containing silicon compound having silanol groups. In this case, the same effect as above is obtained.

(Print Layer 8)

The print layer 8 may be provided as necessary so as to shield wiring circuits arranged in the vicinity of an outer periphery of a display device of mobile instrument and an adhered part between a housing of mobile instrument and the glass laminate 1 for the purpose of, for example, enhancing visibility of display and beauty. The print layer 8 may be provided at a periphery of the second main surface 3 of the glass laminate 1.

The periphery as referred to herein means a band-shaped area having a specific width toward a central part from an outer periphery. The print layer 8 may be provided on the entire periphery of the second main surface 3 (see FIG. 3 and FIG. 4) or may be provided on a part of the periphery.

When the glass laminate 1 includes the print layer 8, for example, the print layer 8 can be appropriately set to have a width enough for shielding the wiring circuits and adhered part. The color of the print layer 8 is not particularly limited, and a desired color can be selected depending on the purpose. The print layer 8 is formed by a method of printing an ink or the like.

The ink is not particularly limited and can be selected depending on the color of the print layer 8 to be formed. Examples of the ink that can be used include an inorganic ink containing a ceramic sintered body, etc. and an organic ink containing a color material, such as a dye and a pigment, and an organic resin.

For example, when the print layer 8 is formed with a black color, examples of the ceramic contained in an inorganic black ink include oxides such as chromium oxide and iron oxide, carbides such as chromium carbide and tungsten carbide, carbon black, and mica. The black print layer 8 is obtained by melting an ink including the ceramic and silica, printing a desired pattern with the ink, and drying the pattern. The inorganic ink requires melting and drying steps and is generally used as a glass-only ink.

The organic ink is a composition containing a dye or pigment having a desired color and an organic resin. Examples of the organic resin include homopolymers, such as an epoxy resin, an acrylic resin, polyethylene terephthalate, a polyethersulfone, a polyarylate, a polycarbonate, an acrylonitrile-butadiene-styrene (ABS) resin, a phenol resin, a transparent ABS resin, polyurethane, polymethyl methacrylate, a polyvinyl-based resin, polyvinyl butyral, a polyetheretherketone, polyethylene, a polyester, polypropylene, a polyamide, and a polyimide, and resins composed of a copolymer of a monomer of such a resin and a copolymerizable monomer.

Of the inorganic inks and organic inks, the organic ink is preferably used from the standpoint of a low drying temperature. The organic ink containing a pigment is preferably used from the viewpoint of chemical resistance.

[Physical Properties of Glass Laminate]
(Water Contact Angle)

A water contact angle of the glass laminate 1 is preferably 90° to 130°, more preferably 100° to 120°, and still more preferably 110° to 120°.

The water contact angle after rubbing of 50,000 times is preferably 100° to 110°, and more preferably 100° to 106°.

When the water contact angle falls within the above-described range, the glass laminate 1 exhibits excellent antifouling property.

The water contact angle is a value of a contact angle against water and can be, for example, measured by subjecting a water droplet of about 1 µL of pure water to drop adhesion onto the outermost surface of the first main surface 2 of the glass laminate 1 and conducting the measurement with a contact angle meter, for example, a device name: DM-501, manufactured by Kyowa Interface Science, Inc.

[Production Method of Glass Laminate]

Each step in the production method of the glass laminate 1 of the present invention is hereunder described.

(Antiglare Treatment)

An antiglare treatment can be applied to the glass substrate 5. A method of subjecting the first main surface 2 of the glass substrate 5 to a surface treatment by a chemical method or a physical method to form a concave-convex shape having a desired surface roughness can be used as the antiglare treatment. In addition, as the antiglare treatment, a coating liquid for antiglare film is applied or sprayed to the first main surface of the glass substrate 5 to deposit an antiglare film on the glass substrate 5, thereby forming a concave-convex shape.

Specific examples of the antiglare treatment by a chemical method include a method of applying a frost treatment. The frost treatment is conducted by, for example, dipping the glass substrate 5 as a material to be treated in a mixed solution of hydrogen fluoride and ammonium fluoride.

The antiglare treatment by a physical method is conducted by, for example, a so-called sandblast method of blowing a crystalline silicon dioxide powder, a silicon carbide powder, or the like to the surface of the glass substrate 5 with pressurized air, or a method of wetting a brush having a crystalline silicon dioxide powder, a silicon carbide powder, or the like adhered thereto with water and polishing the surface of the glass substrate 5 using the brush.

Above all, the frost treatment as a chemical surface treatment is preferably used because microcracks are difficult to be generated on the surface of a material to be treated, and strength of the glass substrate 5 is difficult to decrease.

The first main surface 2 of the glass substrate 5 to which the antiglare treatment has been applied is preferably subjected to an etching treatment in order to shape its surface. For example, a method of dipping the glass substrate 5 in an etching solution as an aqueous solution of hydrogen fluoride to chemically etch the glass substrate 5 can be used as the etching treatment. The etching solution may contain an acid, such as hydrochloric acid, nitric acid, and citric acid, in addition to hydrogen fluoride. When those acids are contained in the etching solution, local generation of precipitates by the reaction between a cationic component, such as a Na ion and a K ion, contained in the glass substrate 5 and hydrogen fluoride can be prevented, and additionally, etching uniformly proceeds within the treating surface.

When the etching treatment is conducted, the etching amount is adjusted by adjusting the concentration of the etching solution, the dipping time of the glass substrate 5 in the etching solution, or the like, thereby adjusting the haze value of the antiglare-treated surface of the glass substrate 5 to a desired value. When the antiglare treatment is conducted by a physical surface treatment, such as a sandblasting treatment, cracks are possibly generated. However, such cracks can be removed by the etching treatment. In addition, the effect of preventing dazzle of the glass laminate 1 is obtained. When the glass substrate 5 is cut into a desired size, the glass substrate is preferably cut after the antiglare treatment and before the subsequent chemical strengthening treatment.

As a method of applying a coating liquid for antiglare film for the antiglare treatment, common wet coating methods (e.g., a spray coating method, an electrostatic coating method, a spin coating method, a dip coating method, a die coating method, a curtain coating method, a screen coating method, an ink jetting method, a flow coating method, a gravure coating method, a bar coating method, a flexo coating method, a slit coating method, and a roll coating method) and the like may be used.

Above all, the spray coating method and the electrostatic coating method (electrostatic spraying method) are exemplified as an excellent method of depositing an antiglare film. The antiglare film can be formed by treating the glass substrate 5 by a spraying apparatus using a coating liquid for antiglare film. Thus, the antiglare treatment of the glass substrate 5 can be performed. In the spray coating method, the haze value and the like can be changed in wide ranges. This is because a concave-convex shape necessary for obtaining required properties can be relatively easily formed by freely changing the amount of the coating liquid or the material constitution. In particular, the electrostatic coating method (electrostatic spraying method) is more preferred.

The coating liquid for antiglare film may contain particles. Examples of the particles include metal oxide particles, metal particles, pigment-based particles, and resin-based particles.

Examples of the material of the metal oxide particles include $Al_2O_3$, $SiO_2$, $SnO_2$, $TiO_2$, $ZrO_2$, ZnO, $CeO_2$, Sb-containing SnOx (antimony-containing tin oxide, ATO), Sn-containing $In_2O_3$ (ITO), and $RuO_2$. $SiO_2$ is preferred for the reason that its refractive index is the same as that of the matrix.

Examples of the material of the metal particles include metals (e.g., Ag and Ru) and alloys (e.g., AgPd and RuAu).

Examples of the pigment-based particles include inorganic pigments (e.g., titanium black and carbon black) and organic pigments.

Examples of the material of the resin particles include an acrylic resin, polystyrene, and a melanine resin.

Examples of the shape of the particles include a scaly shape, a spherical shape, an elliptical shape, a needle shape, a plate shape, a bar shape, a conical shape, a columnar shape, a cubic shape, a rectangular shape, a diamond shape, a star shape, and an amorphous shape. For other particles, each particle may be present in the independent state, each particle may be connected in a chain state, and each particle may be agglomerated.

The particles may be solid particles, may be hollow particles, and may be perforated particles such as porous particles.

Examples of the scaly particles include scaly silica ($SiO_2$) particles, scaly alumina ($Al_2O_3$) particles, scaly titania ($TiO_2$) particles, and scaly zirconia ($ZrO_2$) particles. Scaly silica particles are preferred from the standpoints that the increase of refractive index of the film is prevented, and the reflectance is decreased.

Preferred examples of other particles include silica particles, such as spherical silica particles, bar-shaped silica particles, and needle-like silica particles. Above all, from the standpoints that the haze of an antiglare film-attached substrate is sufficiently increased, and the 60° specular gloss on the surface of the antiglare film sufficiently decreases, and as a result, the antiglare effect is sufficiently exhibited, spherical silica particles are preferred, and porous spherical silica particles are more preferred.

In the electrostatic coating method, the coating liquid for antiglare film is electrostatically charged and sprayed using an electrostatic spraying apparatus including an electrostatic spraying gun. Droplets of the coating liquid for antiglare film sprayed from the electrostatic spraying gun are negatively charged, and therefore, they are attracted toward the grounded glass substrate by electrostatic attraction. As a result, the droplets are efficiently adhered onto the glass substrate 5 as compared with the case of spraying without being electrostatically charged.

One kind of the antiglare treatment method may be conducted alone, and two or more kinds of the antiglare treatment methods may be conducted in combination. For example, the etching treatment and the antiglare treatment by a spray coating method using a coating liquid or the like are each generally conducted alone, but those treatments may be combined.

(Chemical Strengthening Treatment)

The glass substrate 5 can also be chemically strengthened. The chemical strengthening treatment method is not particularly limited, and examples thereof include a method of subjecting the surface of the glass substrate 5 to ion exchanging to form a surface layer having a compressive stress remained therein. Specifically, alkali metal ions having a small ionic radius contained in the glass of the surface of the glass substrate 5 (for example, a Li ion and a Na ion) are substituted with an alkali metal ion having a larger ionic radius (for example, a Na ion or a K ion for the Li ion, and a K ion for the Na ion) at a temperature that is equal to or lower than the glass transition temperature. By the substitution, the compressive stress remains in the surface of the glass substrate 5, thereby improving the strength of the glass substrate 5.

(Formation of Print Layer 8)

A print layer can also be formed on the glass substrate 5. For example, an ink is printed on the side of the second main surface 3 of the glass substrate 5 to form the print layer 8, regardless of applying or not applying the chemical strengthening treatment. Examples of the printing method include a bar coating method, a reverse coating method, a gravure coating method, a die coating method, a roll coating method, a screen printing method, and an inkjet coating method. The screen printing method is preferred from the standpoints that the ink is easily and simply printed, the ink can be printed on various substrates, and the ink can be printed depending on a size of the glass substrate 5. The print layer 8 may be a multilayer including a laminate of a plurality of layers, or may be a single layer. When the print layer 8 is a multilayer, the print layer 8 can be formed by repeating printing and drying of the ink.

(Formation of Antireflection Layer and Antifouling Layer)

(Sticking of Pressure-Sensitive Adhesive and Carrier Substrate)

Figure 3:
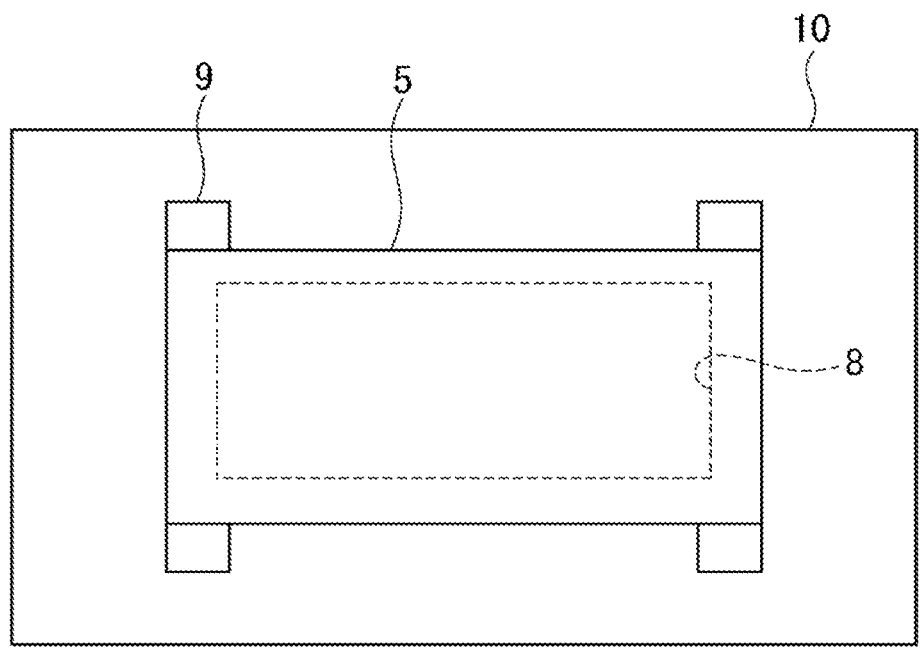
FIG. 3 is a schematic plain view of a glass substrate in the state that a pressure-sensitive adhesive and a carrier substrate have been adhered to the glass substrate.

As shown in FIG. 3, a band-shaped pressure-sensitive adhesive 9 made of a carbon-containing material is adhered onto the second main surface 3 (see FIG. 1) of the glass substrate 5 having the print layer 8 formed thereon, and a carrier substrate 10 is further stuck onto the surface of the pressure-sensitive adhesive 9.

In FIG. 3, the pressure-sensitive adhesive 9 is arranged in such a manner that the both ends in the longitudinal direction are exposed from the outer periphery of the glass substrate 5.

The shape of the pressure-sensitive adhesive 9 is not particularly limited and may be a shape, such as a hook shape, in addition to a band shape shown in FIG. 3. In addition, the pressure-sensitive adhesive 9 may be adhered onto the glass substrate 5 in a continuous or intermittent manner.

When the print layer 8 is formed on the glass substrate 5, the pressure-sensitive adhesive 9 is stuck onto the surface of the print layer 8, but when the print layer 8 is not formed on the glass substrate 5, the pressure-sensitive adhesive 9 is directly stuck onto the second main surface 3.

The arrangement of the pressure-sensitive adhesive 9 and the carrier substrate 10 with respect to the glass substrate 5 is not particularly limited so long as the glass substrate 5 is held by the carrier substrate 10 in the state that the pressure-sensitive adhesive 9 is exposed from the outer periphery of the glass substrate 5. The number of glass substrates 5 to be held by the glass substrate 10 is not particularly limited, and one or a plurality of glass substrates 5 are held by one carrier substrate 10.

(Another Example of Sticking of Pressure-Sensitive Adhesive and Carrier Substrate)

Figure 4:
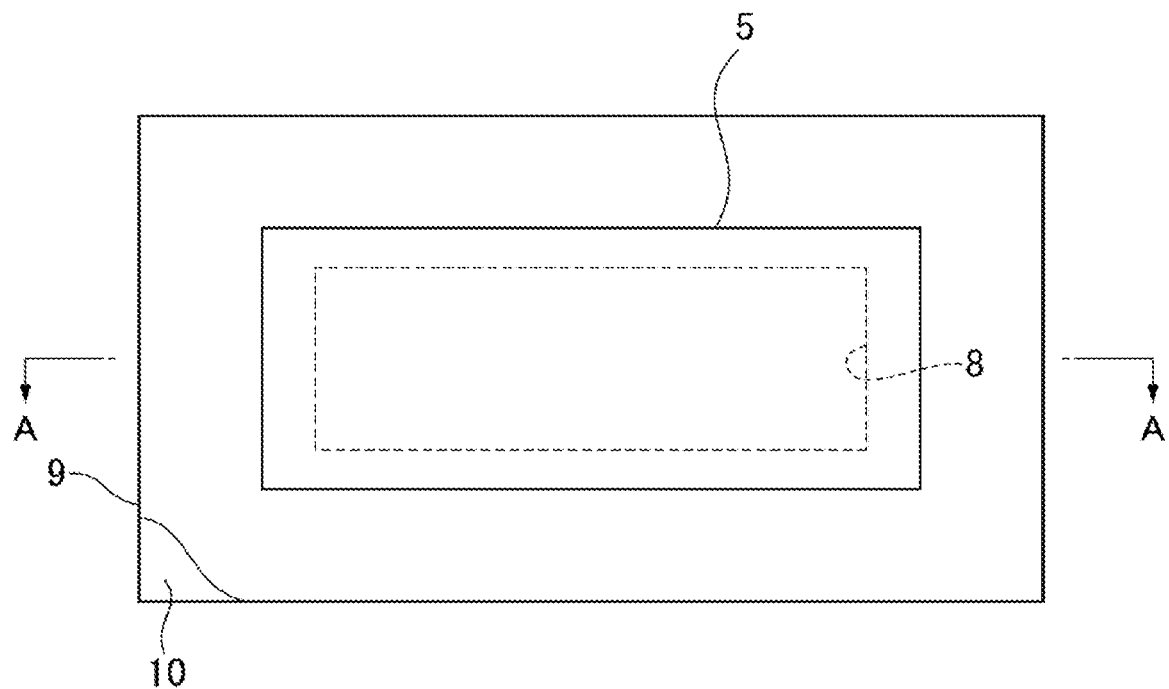
FIG. 4 is a schematic plain view of a glass substrate in the state that a pressure-sensitive adhesive and a carrier substrate have been adhered to the glass substrate in another embodiment.
Figure 5:
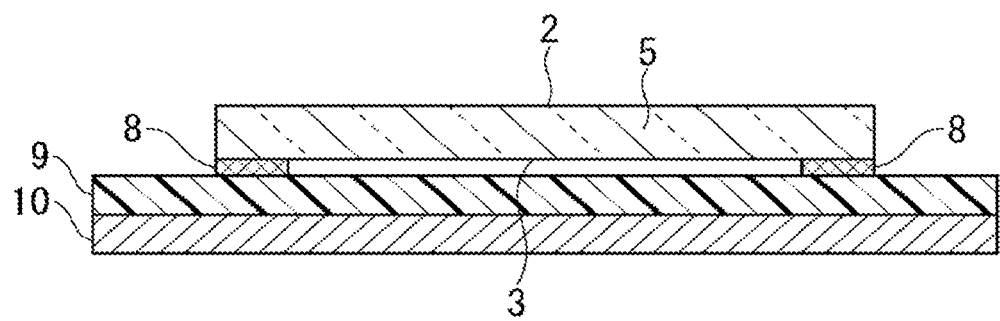
FIG. 5 is a cross-sectional view of the glass substrate, taken along a line A-A of the glass substrate shown in FIG. 4.

FIG. 4 schematically shows another example of the arrangement of the pressure-sensitive adhesive layer 9 and the carrier substrate 10 with respect to the glass substrate 5 when the pressure-sensitive adhesive layer 9 and the carrier substrate 10 are stuck. FIG. 5 is a cross-sectional view of the glass substrate, taken along a line A-A of the glass substrate shown in FIG. 4.

In FIG. 4, the pressure-sensitive adhesive 9 is adhered onto the entire surface of the carrier substrate 10 to which the glass substrate 5 is stuck, and the glass substrate 5 is stuck on the pressure-sensitive adhesive 9. Thus, the pressure-sensitive adhesive 9 may be adhered onto the entire surface of one main surface of the carrier substrate 10, and the glass substrate 5 may be stuck thereto.

The pressure-sensitive adhesive 9 made of a carbon-containing material may be exposed to heating or plasma on the occasion of forming the silicon oxide layer. Accordingly, the pressure-sensitive adhesive 9 is not limited to an embodiment of sticking to the glass substrate 5, and separately from the glass substrate 5, for example, the pressure-sensitive adhesive 9 may be independently arranged on the main surface on the side of the carrier substrate 10 on the side where the glass substrate 5 is stuck.

Though the exposed amount of the pressure-sensitive adhesive 9 varies depending on the material of the pressure-sensitive adhesive 9, an area of the exposed portion is preferably 1 to 50% by area, and more preferably 1 to 20% by area with respect to the area of the first main surface 2 of the glass substrate 5. Thanks to this, the carbon atom is allowed to be contained in the silicon oxide layer in the above-described predetermined concentration.

Examples of the material of the pressure-sensitive adhesive 9 include silicone-based pressure-sensitive adhesives using a silicone rubber or a silicone resin, acrylic pressure-sensitive adhesives synthesized by polymerizing or copolymerizing monomers of at least one of acrylic acid esters, and polyurethane-based pressure-sensitive adhesives using polyurethane. When the glass laminate 1 is assembled in a mobile instrument or the like, the glass laminate 1 is adhered to a display device, such as a mobile instrument, or a housing by an adhesive or the like on the side of the second main surface 3. For this reason, the second main surface 3 preferably has low water repellency and oil repellency from the standpoint of adhesiveness. From such a standpoint, of the materials described above, acrylic or polyurethane-based pressure-sensitive adhesives 9 are preferred as the material of the pressure-sensitive adhesive 9.

The pressure-sensitive adhesive 9 has an adhesive force of preferably 0.02 N/25 mm to 0.4 N/25 mm, and more preferably 0.05 N/25 mm to 0.2 N/25 mm in terms of a value in the measurement of adhesive force to an acryl plate in 180° peeling defined in JIS Z0237: (2009) from the standpoints of a balance in adhesive force between the glass substrate 5 or print layer 8 and the carrier substrate 10 and peelability of the pressure-sensitive adhesive 9 when removing the pressure-sensitive adhesive 9 and the carrier substrate 10 after formation of the antifouling layer.

The pressure-sensitive adhesive 9 preferably has a thickness of 5 μm to 50 μm from the standpoints of adhesive force between the glass substrate 5 or print layer 8 and the carrier substrate 10 and peelability.

The pressure-sensitive adhesive 9 may have a substrate. Examples of the substrate include a polyimide resin, a polyethylene terephthalate (PET) resin, a polyethylene resin, and a polypropylene resin. Of those, a polyimide resin and a polyethylene terephthalate (PET) resin are preferred from the standpoint of heat resistance.

Separately from the glass substrate 5, the carbon-containing material other than the pressure-sensitive adhesive 9 may be arranged on the carrier substrate. In such a case, the amount of carbon contained in the silicon oxide layer can be adjusted depending on the amount of the pressure-sensitive adhesive 9 or the carbon-containing material other than the pressure-sensitive adhesive 9 arranged separately from the glass substrate 5. The amount of the pressure-sensitive adhesive 9 or the carbon-containing material other than the pressure-sensitive adhesive 9 arranged separately from the glass substrate 5 may be, for example, identical to the above-described exposed amount of the pressure-sensitive adhesive 9.

For example, in the case of aiming to incorporate a carbon atom in the silicon oxide layer, as the carbon-containing material other than the pressure-sensitive adhesive 9, resins, such as a polyethylene terephthalate (PET) resin, a polyethylene resin, and a polypropylene resin, a grease (fats and oils), and the like may be used. In this case, the shape of the resin is not particularly limited and may be appropriately designed into a film shape, a block shape, or the like depending on production conditions or the like.

By selecting the material of the pressure-sensitive adhesive 9 or using other material than the pressure-sensitive adhesive 9, a layer having a desired element incorporated in a silicon oxide layer can be formed. When a component to be contained in the material of the pressure-sensitive adhesive 9 or the material other than the pressure-sensitive layer is volatilized upon being exposed to heating or plasma during forming the silicon oxide layer, the layer having the foregoing element incorporated in the silicon oxide layer is formed.

When an atom other than the carbon atom is contained in the silicon oxide layer, for example, in the case of incorporating a fluorine atom, separately from the glass substrate 5, a fluorine-containing pressure-sensitive adhesive or a fluorine-containing material other than the pressure-sensitive adhesive 9 is arranged on the main surface of the carrier substrate 10 on the side where the glass substrate 5 is stuck. On this occasion, as the fluorine-containing material, fluorine-containing resins, such as a polytetrafluoroethylene (PTFE) resin, a tetrafluoroethylene-perfluoroalkoxyethylene copolymer (PFA) resin, and a tetrafluoroethylene-ethylene copolymer (ETFE) resin, and fluorine-containing greases may be used. In this case, the shape of the fluorine-containing resin is not particularly limited and may be appropriately designed into a film shape, a block shape, or the like depending on production conditions or the like.

The carrier substrate 10 is not particularly limited so long as it is a material having a strength to an extent that it can be maintained in a vertical state or a horizontal state while holding the glass substrate 5 and capable of withstanding conditions, such as temperature, pressure, and atmosphere, for forming the antireflection layer 6 and the antifouling layer 7, and the carrier substrate 10 made of a glass, a resin, a metal, or the like can be used. As the shape of the carrier substrate 10, a plate-shaped or film-shaped substrate may be used. When the carrier substrate 5 has a curved surface, the carrier substrate 10 may be processed into a shape corresponding to the second main surface 3 of the glass substrate 5.

Specifically, a polyethylene terephthalate (PET) resin, a polyethylene resin, and a polypropylene resin are preferably used as the carrier substrate 10 made of a resin. As the carrier substrate 10 made of a resin, a polyimide resin and a PET resin are preferred from the viewpoint of heat resistance, and of those, a PET resin is more preferred from the viewpoint of cost. The carrier substrate 10 made of a resin preferably has a film shape, and the films of the above-described resins are preferably used.

The carrier substrate 10 to which the pressure-sensitive adhesive 9 has been applied, such as a pressure-sensitive adhesive-attached protective film, may be used. In this case, the pressure-sensitive adhesive-attached film is continuously supplied and put on the second main surface 3 using a laminating machine while conveying the glass substrate 5, and a pressure is then applied to stick the film to the glass substrate 5. On this occasion, laminating conditions are not particularly limited, and for example, the pressure-sensitive adhesive-attached film is stuck onto the second main surface 3 under conditions of a conveying speed of the glass substrate 5 being 1 mm/min to 5 mm/min and an applied pressure being 1 kgf/cm$^2$ to 10 kgf/m$^2$ in terms of a linear pressure.

Examples of the carrier substrate 10 provided with the pressure-sensitive adhesive 9 include No. 6500 (trade name, manufactured by Hitachi Maxell, Ltd.) as a silicone-based pressure-sensitive adhesive-attached polyimide tape, RP-207 (trade name, manufactured by Nitto Denko Corporation) as an acrylic pressure-sensitive adhesive-attached PET film, and UA-3004AS (trade name, manufactured by Sumiron Co., Ltd.) as a polyurethane-based pressure-sensitive adhesive-attached PET film. The holding of the substrate and incorporation of carbon can be efficiently conducted by using the carrier substrate 10 provided with the pressure-sensitive adhesive 9.

When the pressure-sensitive adhesive 9 has a sufficient holding force to the glass substrate 5, the pressure-sensitive adhesive 9 further has the function of the carrier substrate 10. As a result, the carrier substrate 10 may not be separately used.

Though the size of the carrier substrate 10 is not particularly limited, it is preferably larger than the second main surface 3 of the glass substrate 5 from the standpoint of a holding force to the glass substrate 5. When the size of the carrier substrate 10 is larger than that of the glass substrate 5, for example, in the case where the antireflection layer 6 is formed by sputtering, an antireflection layer forming material achieves the edge surfaces 4 in the course of sputtering, and the antireflection layer 6 is also formed on the edge surfaces 4. Furthermore, when the antifouling layer 7 is formed by vapor deposition, an antireflection layer forming material achieves the edge surfaces 4 in the course of vapor deposition, and the antifouling layer 7 is also formed on the edge surfaces 4. Thus, the antireflection layer 6 and the antifouling layer 7 are formed on the region of from the first main surface 2 of the glass substrate 5 to the edge surfaces 4. In this case, the antireflection layer 6 and the antifouling layer 7 layers are provided on the large part on the first main surface 2 and the edge surfaces 4 in the state that those layers may develop the respective functions. In this embodiment, the generation of microcracks on the edge surfaces 4 is prevented, and a high strength can be imparted to the glass laminate 1.

The carrier substrate 10 having a size smaller than the area of the second main surface 3 may be used. In this case, for example, the antireflection layer 6 is formed by sputtering in the state that the glass substrate 5 is stuck onto the carrier substrate 10 having a size smaller than the area of the second main surface 3, and the antifouling layer 7 is further formed by vapor deposition. Thus, the antireflection layer 6 and the antifouling layer 7 can be formed up to the vicinity of the outer periphery of the outermost surface on the side of the second main surface 3.

(Deposition of Antireflection Layer 6)

The antireflection layer 6 is deposited by using a sputtering method of sputtering an antireflection layer forming material toward the first main surface 2 in the state that the carrier substrate 10 is stuck to the glass substrate 5.

A dense film having high durability can be formed by using a sputtering method. The deposition is particularly preferably conducted by a sputtering method, such as a pulse sputtering method, an AC sputtering method, and a digital sputtering method.

For example, in the case of conducting the deposition by a pulse sputtering method, the glass substrate 5 is arranged in a chamber having a mixed gas atmosphere of an inert gas and an oxygen gas, a target is selected so as to have a desired composition as an antireflection layer forming material, and the deposition is conducted. In this case, though the gas species of the inert gas in the chamber is not particularly limited, and various inert gases, such as argon and helium, may be used.

Though the pressure in the chamber containing the mixed gas of an inert gas and an oxygen gas is not particularly limited, when the pressure is set to a range of 0.5 Pa or less, the surface roughness of the film to be formed is easy to be controlled to a preferred range. This is considered to be due to the following reasons. That is, when the pressure in the chamber containing the mixed gas of an inert gas and an oxygen gas is 0.5 Pa or less, a mean free path of molecules to be deposited is ensured, and the molecules to be deposited reach the substrate with a higher energy. As a result, it is considered that rearrangement of deposited molecules is promoted, and a relatively dense film having a smooth surface can be formed. Though the lower limit of the pressure in the chamber containing the mixed gas of an inert gas and an oxygen gas is not particularly limited, for example, the pressure is preferably 0.1 Pa or more.

In order to form the carbon-containing silicon oxide layer constituting the outermost layer 61 or the like, the formation of the silicon oxide layer is conducted in the state that a pressure-sensitive adhesive made of a carbon-containing material is exposed from the outer periphery of the glass substrate 5 and adhered onto the surface of the print layer 8 on the second main surface 3 of the glass substrate 5. Thanks to this, when forming the silicon oxide layer, the carbon component contained in the carbon-containing material is volatized from a portion of the pressure-sensitive adhesive exposed from the outer periphery of the glass substrate 5 and incorporated in the silicon oxide layer by heating or collision of the high energy molecules to be deposited. Thus, the carbon-containing silicon oxide layer containing the carbon atom in the above-described predetermined proportion can be formed. On this occasion, the content of the carbon atom can be adjusted by changing the area of the pressure-sensitive adhesive exposed from the outer periphery of the glass substrate 5, or the like.

The carbon component contained in the pressure-sensitive adhesive is volatized and incorporated in the silicon oxide layer by heating or collision of the high energy molecules to be deposited, and thus, it is also possible to select the material constituting the pressure-sensitive adhesive to form a layer having an element other than carbon, for example, fluorine (F), incorporated in the silicon oxide layer. Furthermore, when a material containing an element that is intended to be incorporated in the silicon oxide layer, other than the pressure-sensitive adhesive, is used to form the silicon oxide layer in the state that the foregoing material is exposed to heat or plasma, the silicon oxide layer having the foregoing element incorporated therein can be formed.

When the high refractive index layer and the low refractive index layer are deposited by a pulse sputtering method, the thickness of each layer can be, for example, adjusted by adjusting a discharge power, a deposition time, or the like.

The carbon concentrations of the high refractive index layer and the low refractive index layer can be, for example, adjusted by a deposition power represented by a power density or the like, or an exposed area of the pressure-sensitive adhesive 9 from the outer periphery of the glass substrate 5. As the deposition power is large and the exposed area of the pressure-sensitive adhesive is large, the carbon concentrations of the high refractive index layer and the low refractive index layer become high.

Thanks to the foregoing steps, the antireflection layer 6 including the outermost layer 61 having a carbon concentration of $5 \times 10^{18}$ atoms/cm$^3$ or more and $6 \times 10^{19}$ atoms/cm$^3$ or less and the second layer 62 having a carbon concentration of $3 \times 10^{18}$ atoms/cm$^3$ or more and $5 \times 10^{19}$ atoms/cm$^3$ or less is deposited.

(Deposition of Antifouling Layer 7)

The antifouling layer 7 is formed by depositing an antifouling layer forming material toward the first main surface 2 having the antireflection layer 6 formed thereon in the state that the glass substrate 5 is stuck to the carrier substrate 10.

Figure 6:
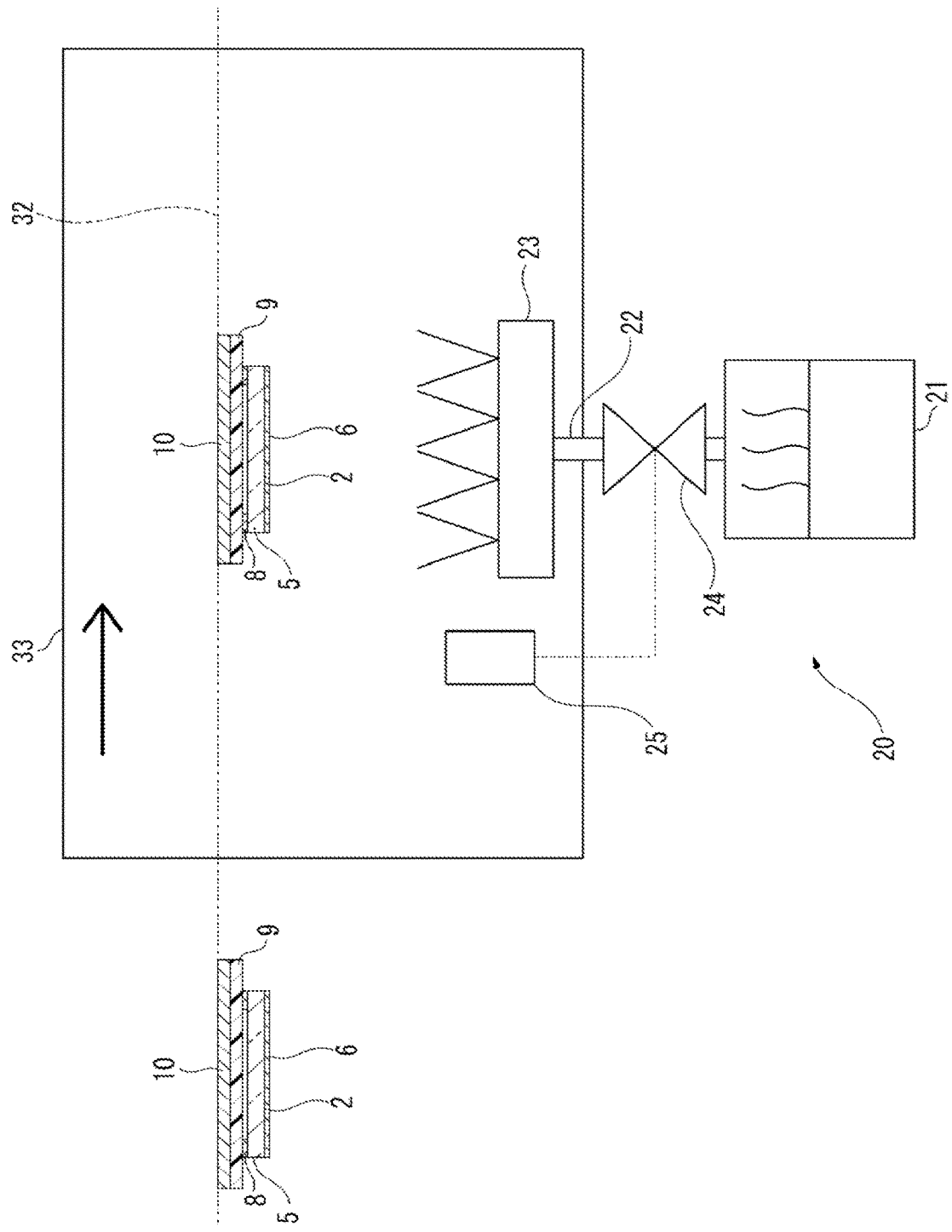
FIG. 6 is a schematic view of an apparatus for forming an antifouling layer as one example.

FIG. 6 is a schematic view of an apparatus which can be used for forming the antifouling layer 7. The apparatus shown in FIG. 6 is an apparatus of depositing a composition containing a fluorine-containing hydrolyzable silicon compound on the first main surface 2 of the glass substrate 5.

In the case of using the apparatus shown in FIG. 6, the glass substrate 5 having the antireflection layer 6 formed thereon is conveyed from the left side to the right side in the drawing by a conveying unit 32. Thus, the antifouling layer 7 is formed in a vacuum chamber 33 to form the glass laminate 1.

In the vacuum chamber 33, a coating film forming composition is adhered to the first main surface 2 of the glass substrate 5 using a vacuum vapor deposition apparatus 20 by a vacuum deposition method, particularly a resistance heating method.

The pressure in the vacuum chamber 33 is maintained at preferably 1 Pa or less, and more preferably 0.1 Pa or less from the viewpoint of production stability. The vacuum deposition by a resistance heating method can be carried out under the foregoing pressure without any problem.

The vacuum deposition apparatus 20 includes a heating vessel 21 for heating the coating film forming composition outside the vacuum chamber 33, a piping 22 for supplying a vapor of the coating film forming composition into the vacuum chamber 33, and a manifold 23 having an injection port for injecting the vapor to be supplied through the piping 22. In addition, in the vacuum chamber 33, the glass substrate 5 is held such that the injection port of the manifold 23 and the first main surface 2 of the glass substrate 5 face each other.

The heating vessel 21 includes a heating unit capable of conducting heating to a temperature at which the coating film forming composition that is a vapor deposition source has a sufficient vapor pressure. Though the heating temperature varies depending on the kind of the coating film forming composition, specifically, the heating temperature is preferably 30° C. to 400° C., and especially preferably 150° C. to 350° C. When the heating temperature is equal to or higher than the lower limit in the above-described range, the deposition rate becomes favorable. When the heating temperature is equal to or lower than the upper limit in the above-described range, a coating film having antifouling property can be formed above the first main surface 2 of the glass substrate 5 without occurring decomposition of the fluorine-containing hydrolyzable silicon compound.

Here, in the above-described method, the following pretreatment is preferably conducted when conducting the vacuum deposition: the coating film forming composition containing a fluorine-containing hydrolyzable silicon compound is heated in the heating vessel 21 up to a vapor deposition initiation temperature, and then, its vapor is discharged outside the system for a predetermined time. Thanks to this pretreatment, a low molecular weight component and the like generally contained in the fluorine-containing hydrolyzable silicon compound and affecting durability of the resulting coating film can be removed, and furthermore, it becomes possible to stabilize the composition of the raw material vapor to be supplied from the deposition source. Thanks to this, it becomes possible to stably form the fluorine-containing organosilicon compound coating film having high durability. Specifically, a method in which separately from the piping 22 connected to the manifold 23, a piping (not shown) connected to an openable/closable exhaust port for discharging an initial vapor outside the system is provided in an upper part of the heating vessel 21, thereby trapping the low molecular weight component and the like may be adopted.

The temperature of the glass substrate 5 during the vacuum vapor deposition is preferably a range of from room temperature (20° C. to 25° C.) to 200° C. When the temperature of the glass substrate 5 is 200° C. or lower, the deposition rate becomes satisfactory. The upper limit of the temperature of the glass substrate 5 is more preferably 150° C., and especially preferably 100° C.

In order to control the deposition rate, it is preferred that a variable valve 24 is provided on the piping 22 to control a degree of opening of the variable valve 24 on the basis of a detected value by a film thickness gauge 25 provided in the vacuum chamber 33. By providing such a structure, the amount of the vapor of the composition containing a fluorine-containing hydrolyzable silicon compound to be supplied onto the first main surface 2 of the glass substrate 5 can be controlled. Thanks to this, a coating film having a target thickness can be formed with good accuracy on the first main surface 2 of the glass substrate 5. As the film thickness gauge 25, a crystal oscillator monitor and the like may be used. Furthermore, the thickness of the actually deposited antifouling layer 7 can be calculated from a vibration period of an interference pattern of reflected X-ray obtained by an X-ray reflectance method (XRR) using, for example, an X-ray diffractometer for thin film analysis, ATX-G (manufactured by Rigaku Corporation).

Thus, the coating film forming composition containing a fluorine-containing hydrolyzable silicon compound is adhered onto the antireflection layer 6 on the glass substrate 5. Furthermore, the fluorine-containing hydrolyzable silicon compound undergoes a hydrolysis condensation reaction simultaneously with adhesion or after adhesion, and then, the fluorine-containing hydrolyzable silicon compound chemically bonds to the antireflection layer 6 and additionally undergoes siloxane bonding between molecules, thereby forming a fluorine-containing organosilicon compound coating film.

The hydrolysis condensation reaction of the fluorine-containing hydrolyzable silicon compound proceeds on the surface of the antireflection layer 6 simultaneously with adhesion. To further sufficiently accelerate the reaction, as necessary, the glass substrate 5 having the fluorine-containing organosilicon compound coating film formed thereon may be taken out of the vacuum chamber 33 and then subjected to a heating treatment using a hotplate or a thermo-hygrostat bath. Example of the heat treatment includes a heat treatment at a temperature of 80 to 200° C. for 10 minutes to 60 minutes.

The formation of the antifouling layer 7 may be conducted in the state that the inside of the chamber 33 is humidified by a humidifying device or the like connected to the chamber 33. The heating treatment and the humidifying treatment may be carried out separately or simultaneously. In addition, after forming the antifouling layer 7, by subjecting the surface of the fluorine-containing organosilicon compound coating film to etching or the like by, for example, an acid treatment or an alkali treatment, the surface roughness (Ra) of the fluorine-containing organosilicon compound coating film may be adjusted to, for example, 10 nm or less.

After forming the antifouling layer 7, the pressure-sensitive adhesive 9 and the carrier substrate 10 stuck on the side of the second main surface 3 of the glass substrate 5 are removed to obtain the glass laminate 1.

The glass laminate 1 thus obtained has excellent antifouling property, such as water repellency and oil repellency, and additionally, the antifouling layer has high abrasion resistance. The glass laminate 1 is provided to constitute the front plate 1A for display.

[Effects of Glass Laminate]

The carbon concentration of the second layer 62 of the antireflection layer 6 as the high refractive index layer is $3\times10^{18}$ atoms/cm$^3$ or more and $5\times10^{19}$ atoms/cm$^3$ or less and is lower than the carbon concentration of the outermost layer 61. As a result, even when the outermost layer 61 is scratched, scratches are prevented from propagating to the second layer 62, and durability of the antireflection layer 6 is improved.

[Display Device]

One example of a display device 11 including the glass laminate 1 manufactured by the foregoing steps is described below by reference to FIG. 7. Examples of the display device in this embodiment include a display device, such as an in-vehicle car navigation system, and a mobile display device, such as a smart phone.

Figure 7:
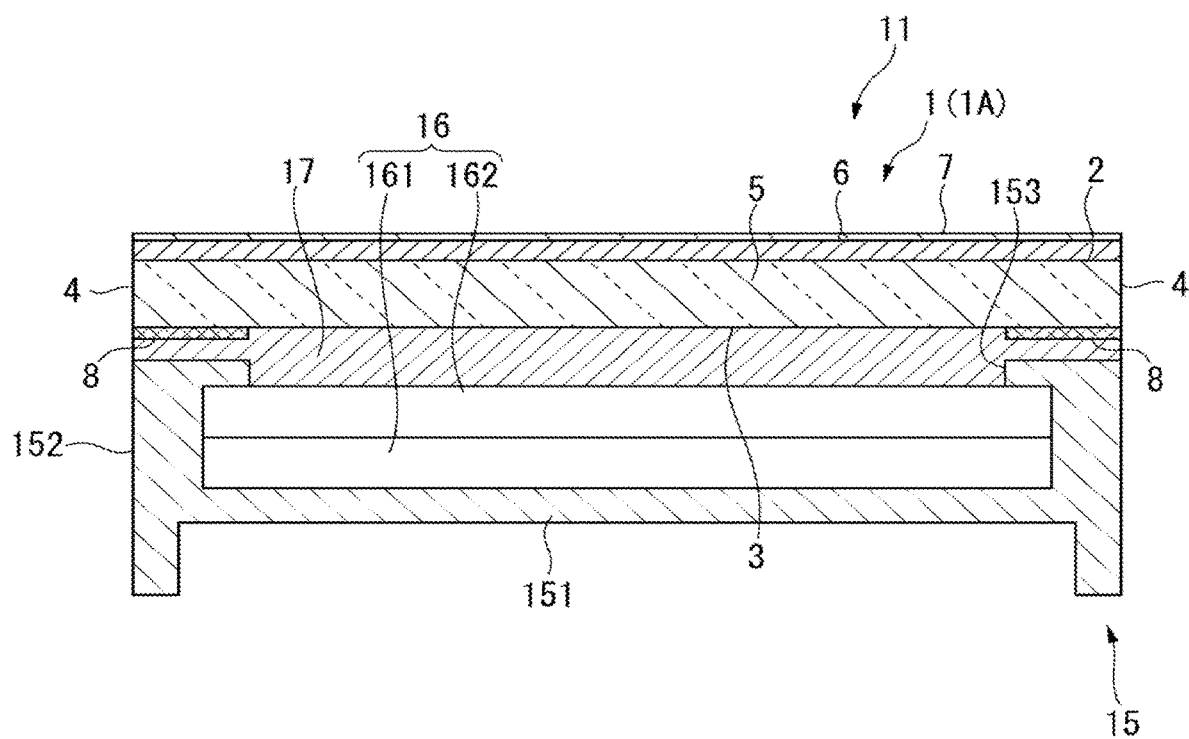
FIG. 7 is a schematic cross-sectional view of a display device in one embodiment of the present invention.

The display device 11 shown in FIG. 7 is one example of an in-vehicle display device. The display device 11 includes a frame 15. The frame 15 includes a bottom 151, a side wall 152 intersecting with the bottom 151, and an opening 153 facing the bottom 151. A liquid crystal module 16 is arranged in the space surrounded by the bottom 151 and the side wall 152. The liquid crystal module 16 includes a backlight 161 arranged on the side of the bottom 151 and a liquid crystal panel 162 as a display panel arranged on the backlight 161. The liquid crystal panel 162 includes an IPS liquid crystal and is of an in-cell type in which an element having a touch function is embedded in a liquid crystal element.

The front plate 1A for display including the glass laminate 1 is provided at the upper edge of the frame 15. The front plate 1A for display is adhered to the frame 15 and the liquid crystal module 16 through the adhesive layer 17 provided on the opening 153 and the upper edge face of the side wall 152.

The adhesive layer 17 is preferably transparent and has a small difference in refractive index from a chemically strengthened glass. Example of the adhesive layer 17 includes a layer made of a transparent resin obtained by curing a liquid curable resin composition. Examples of the curable resin composition include a photocurable resin composition and a thermosetting resin composition. Of those, a photocurable resin composition containing a curable compound and a photopolymerization initiator is preferred. The curable resin composition is applied, for example, by a method using a die coater, a roll coater, or the like to form a curable resin composition film.

The adhesive layer 17 may be an OCA film (OCA tape).

[Modification of Glass Substrate 5]

(Composition)

The composition of the glass of the glass substrate 5 is preferably a composition which allows the glass substrate to be formed and strengthened by a chemical strengthening treatment, and preferably contains alkali metals having a small ionic radius, such as sodium and lithium. Specifically, as such a glass, for example, an aluminosilicate glass, a soda lime silicate glass, a borosilicate glass, a lead glass, an alkali barium glass, and an aluminoborosilicate glass are preferably used.

Glasses having various compositions may be used as the glass composition of the glass substrate 5 without being particularly limited. Examples of the glass composition include the following glass compositions (all of the compositions are an aluminosilicate glass).

(i) A glass having a composition containing, in terms of mol %, 50 to 80% of $SiO_2$, 2 to 25% of $Al_2O_3$, 0 to 10% of $Li_2O$, 0 to 18% of $Na_2O$, 0 to 10% of $K_2O$, 0 to 15% of MgO, 0 to 5% of CaO, and 0 to 5% of $ZrO_2$ (ii) A glass having a composition containing, in terms of mol %, 50 to 74% of $SiO_2$, 1 to 10% of $Al_2O_3$, 6 to 14% of $Na_2O$, 3 to 11% of $K2O$, 2 to 15% of MgO, 0 to 6% of CaO, and 0 to 5% of $ZrO_2$, in which the total content of $SiO_2$ and $Al_2O_3$ is 75% or less, the total content of $Na_2O$ and $K_2O$ is 12 to 25%, and the total content of MgO and CaO is 7 to 15%

(iii) A glass having a composition containing, in terms of mol %, 68 to 80% of $SiO_2$, 4 to 10% of $Al_2O_3$, 5 to 15% of $Na_2O$, 0 to 1% of $K_2O$, 4 to 15% of MgO, and 0 to 1% of $ZrO_2$ (iv) A glass having a composition containing, in terms of mol %, 67 to 75% of $SiO_2$, 0 to 4% of $Al_2O_3$, 7 to 15% of $Na_2O$, 1 to 9% of $K_2O$, 6 to 14% of MgO, and 0 to 1.5% of $ZrO_2$, in which the total content of $SiO_2$ and $Al_2O_3$ is 71 to 75%, and the total content of $Na_2O$ and $K_2O$ is 12 to 20%, and when CaO is contained, the CaO content is less than 1%

A glass containing coloring components (e.g., oxides of a metal such as Co, Mn, Fe, Ni, Cu, Cr, V, Bi, Se, Ti, Ce, Er, and Nd) to an extent that visibility is not impaired may be used as the glass substrate 5.

(Production Method)

The production method of the glass substrate 5 is not particularly limited and the glass substrate 5 can be produced by adding desired glass raw materials to a continuous melting furnace, melting the glass raw materials at a temperature of preferably 1,500 to 1,600° C., clarifying the resulting melt, supplying the melt to a molding apparatus, molding the molten glass into a plate shape, and slowly cooling the resulting molding.

The molding method of the glass substrate 5 is also not particularly limited, and examples thereof include downdraw processes (for example, an overflow downdraw process, a slotdown process, and a redraw process) and molding processes such as a float process, a rollout process, and a press process.

[Modification of Functional Layer]

In the present invention, the functional layer is not limited in terms of a specific structure so long as it has a structure in which at least two layers having a refractive index different from each other are alternately laminated; the main component of the outermost layer is $SiO_2$; and the carbon concentration of the second layer is $3 \times 10^{18}$ atoms/cm$^3$ or more and $5 \times 10^{19}$ atoms/cm$^3$ or less and is lower than the carbon concentration of the outermost layer. Example of the functional layer include a solar reflection film and a dichroic mirror

[Modification of Antifouling Layer]

In the present invention, the coating film forming composition for forming the antifouling layer 7 is not particularly limited so long as it is a composition containing a fluorine-containing hydrolyzable silicon compound and is a composition capable of forming a coating film by vacuum vapor deposition. The coating film forming composition may contain optional component(s) other than the fluorine-containing hydrolyzable silicon compound and may be constituted of only the fluorine-containing hydrolyzable silicon compound. Examples of the optional component include a hydrolyzable silicon compound not containing a fluorine atom (hereinafter referred to as a "fluorine-free hydrolyzable silicon compound) and a catalyst, and those are used in an amount that does not impair the effects of the present invention.

When the fluorine-containing hydrolyzable silicon compound and optionally, the fluorine-free hydrolyzable silicon compound are blended in the coating film forming composition, each compound may be blended as it is or may be blended as a partially hydrolyzed condensate thereof. Furthermore, a mixture of the compound and its partially hydrolyzed condensate may be blended in the coating film forming compound.

When two or more kinds of hydrolyzable silicon compounds are used in combination, each compound may be blended in the coating film forming composition as it is, may be blended as each partially hydrolyzed condensate, or may be blended as a partially hydrolyzed condensate of two or more kinds of compounds. In addition, a mixture of those compounds, the partially hydrolyzed condensate, and the partially hydrolyzed cocondensate may be added. However, the partially hydrolyzed condensate and partially hydrolyzed cocondensate used have a degree of polymerization to an extent that the vacuum vapor deposition is possible. The term "hydrolyzable silicon compound" as referred to hereinafter is used in the meaning of including the partially hydrolyzed condensate and partially hydrolyzed cocondensate, in addition to the compound itself.

The fluorine-containing hydrolyzable silicon compound which is used to form the fluorine-containing organosilicon compound coating film is not particularly limited so long as the fluorine-containing organosilicon compound coating film obtained has antifouling property, such as water repellency and oil repellency.

Specific examples thereof include a fluorine-containing hydrolyzable silicon compound having at least one group selected from the group consisting of a perfluoropolyether group, a perfluoroalkylene group, and a perfluoroalkyl group. Those groups are present as a fluorine-containing organic group bonded to a silicon atom of a hydrolyzable silyl group through a linkage group or directly. Examples of a preferred commercially available fluorine-containing organosilicon compound (fluorine-containing hydrolyzable silicon compound) containing at least one group selected from the group consisting of a perfluoropolyether group, a perfluoroalkylene group, and a perfluoroalkyl group include KP-801 (trade name, manufactured by Shin-Etsu Chemical Co., Ltd.), X-71 (trade name, manufactured by Shin-Etsu Chemical Co., Ltd.), KY-130 (trade name, manufactured by Shin-Etsu Chemical Co., Ltd.), KY-178 (trade name, manufactured by Shin-Etsu Chemical Co., Ltd.), KY-185 (trade name, manufactured by Shin-Etsu Chemical Co., Ltd.), KY-195 (trade name, manufactured by Shin-Etsu Chemical Co., Ltd.), Afluid (registered trademark) S-550 (trade name, manufactured by AGC, Inc.), and Optool (registered trademark) DSX (trade name, manufactured by Daikin Industries, Ltd.). Of those, KY-185, KY-195, Optool DSX, and S-550 are more preferably used.

When the commercially available fluorine-containing hydrolyzable silicon compound is supplied together with a solvent, the solvent is removed from the resulting mixture, and the compound is used. The coating film forming composition is prepared by mixing the fluorine-containing hydrolyzable silicon compound and an optional component added as necessary and is subjected to vacuum vapor deposition.

The coating film forming composition containing a fluorine-containing hydrolyzable silicon compound is adhered onto the surface of the antireflection layer 6, followed by reacting and depositing to obtain the fluorine-containing organosilicon compound coating film. As the specific vacuum vapor deposition and reaction conditions, common methods and conditions and so on can be applied.

[Modification of Antireflection Layer 6 and Antifouling Layer 7]

(Modification of Deposition Position of Antireflection Layer 6 and Antifouling Layer 7)

The antireflection layer 6 and the antifouling layer 7 may be each provided on the side of the second main surface 3 in place of the first main surface 2 of the glass substrate 5 or in addition to the first main surface 2. In this case, the antireflection layer 6 and the antifouling layer 7 may be provided up to the edge surfaces 4.

(Modification of Deposition Method of Antireflection Layer 6)

The method for depositing each layer of the antireflection layer 6 is not limited to the sputtering method, and various deposition methods can be used. For example, a vacuum vapor deposition method, an ion beam assist vapor deposition method, an ion plating method, and a plasma CVD method may be used.

(Modification of Deposition Method of Antifouling Layer 7)

The method for forming the antifouling layer 7 is not limited to the vapor deposition method. That is, examples of the method for forming the fluorine-containing organosilicon compound coating film include a method of applying a composition of a silane coupling agent having a perfluoroalkyl group or a fluoroalkyl group containing a perfluoro (polyoxyalkylene) chain to the surface of the antireflection layer 6 formed on the first main surface 2 of the glass substrate 5 by a spin coating method, a dip coating method, a casting method, a slit coating method, a spray coating method, or the like, followed by heat-treating as necessary; and a vacuum vapor deposition method of vapor phase-depositing the fluorine-containing organosilicon compound on the surface of the antireflection layer 6, followed by heat-treating as necessary. In order to obtain the fluorine-containing organosilicon compound coating film having high adhesion, the coating film is preferably formed by a vacuum vapor deposition method. The formation of the fluorine-containing organosilicon compound coating film by a vacuum vapor deposition method is preferably conducted using the coating film forming composition containing the fluorine-containing hydrolyzable silicon compound.

EXAMPLES

Examples of the present invention and Comparative Examples are hereunder described. However, the present invention is not construed as being limited to the following Examples.

Cases 1 to 10 are Examples of the present invention, and Cases 11 to 13 are Comparative Examples.

Glass laminates were obtained by the following procedures of the respective cases using a plate-shaped glass DT having a thickness of 1.3 mm and a tetragon of a pair of opposite main surfaces (Dragontrail (registered trademark) that is not subjected to a strengthening treatment, manufactured by AGC, Inc., aluminosilicate glass for chemical strengthening) as a glass substrate.

(Case 1)

The glass substrate was subjected to (1) an antiglare treatment, (2) a chemical strengthening treatment, (3) an alkali treatment, (4) formation of a black print layer, (5) formation of an antireflection layer (low reflection film), and (6) formation of an antifouling layer in this order with the following procedures, thereby obtaining a glass laminate.

(1) Antiglare Treatment (AG)

An antiglare treatment by a frost treatment was applied to a first main surface of a glass substrate by the following procedures.

First of all, an acid-resistant protective film was adhered to a second main surface of the glass substrate to which the antiglare treatment was not intended to be applied. Subsequently, the glass substrate was dipped in a 3 mass % hydrogen fluoride aqueous solution for 3 minutes, and the first main surface of the glass substrate was etched to remove stains adhered to the surface. Subsequently, the glass substrate was dipped in a mixed aqueous solution of 15 mass % hydrogen fluoride and 15 mass % potassium fluoride for 3 minutes to apply the frost treatment to the first main surface of the glass substrate. The glass substrate was dipped in a 10 mass % hydrogen fluoride aqueous solution for 6 minutes to adjust a haze value of the first main surface to 25%. The haze value was measured using a haze meter (trade name: HZ-V3, manufactured by Suga Test Instruments Co., Ltd.) in accordance with JIS K7136: (2000).

The glass substrate having been subjected to the antiglare treatment was cut into a size of 150 mm×250 mm and then subjected to a chemical strengthening treatment.

(2) Chemical Strengthening Treatment

The protective film adhered to the glass substrate was removed, and the glass substrate was dipped in potassium nitrate salt heated and melted at 450° C. for 2 hours. The glass substrate was then taken out of the molten salt and slowly cooled to room temperature over 1 hour to obtain a chemically strengthened glass substrate. The chemically strengthened glass substrate thus obtained had a surface compressive stress (CS) of 730 MPa and a depth of stress layer (DOL) of 30 μm.

(3) Alkali Treatment

Subsequently, the glass substrate was dipped in an alkali solution (Sun Wash TL-75, manufactured by Lion Corporation) for 4 hours to remove stains on the surface.

(4) Formation of Black Print Layer

Subsequently, four sides of the periphery of the second main surface of the glass substrate, to which the antiglare treatment was not applied, were printed in a black frame shape having a width of 2 cm by screen printing in the following procedures to form a black print layer. First of all, a black ink (trade name: GLSHF, manufactured by Teikoku Inks Printing Mfg. Co., Ltd.) as an organic ink containing a pigment was applied to have a thickness of 5 μm by a screen printing machine, and then maintained at 150° C. for 10 minutes for drying the ink. Thus, a first print layer was formed. Subsequently, the same kind of the black ink used above was applied to have a thickness of 5 μm to the first print layer in the same procedures as above and then maintained at 150° C. for 40 minutes for drying the ink. Thus, a second print layer was formed. The black print layer including a stack of the first print layer and the second print layer was formed as above, thereby obtaining a glass substrate having the black print layer on the outer periphery of the second main surface.

(5) Formation of Antireflection Layer

Subsequently, an antireflection layer was formed on the first main surface and side surface, which have been subjected to the antiglare treatment, in the following method. In Case 1, the antireflection layer was formed with two high refractive index layers and two low refractive index layer, i.e., four layers in total.

First of all, a double-sided polyimide tape (trade name: No. 6500, manufacture by Hitachi Maxell Co., Ltd.) having 20 mm in width×400 mm in length was adhered as a pressure-sensitive adhesive on the black print layer on the second main surface of the glass substrate. The glass substrate was adhered to a carrier substrate having a thickness of 2 mm and a size of 1,000 mm×1,000 mm square, which was larger than the glass substrate. On this occasion, the double-sided tape was arranged such that it was exposed by 2 mm in the longitudinal direction thereof from the outer periphery of each of a pair of opposing sides of the glass substrate. Thanks to this, the carbon-containing component was volatized from this exposed portion by heating or plasma during forming the antireflection layer and incorporated in the antireflection layer. In Case 1, the area of the exposed portion of the pressure-sensitive adhesive is 5 area % relative to the area of the first main surface of the glass substrate.

An antireflection layer was deposited in the following step in the state that the glass substrate was stuck to the carrier substrate.

First of all, pulse sputtering was conducted under the conditions of a pressure of 0.3 Pa, a frequency of 20 kHz, a deposition power of 1.5 W/cm$^2$, and an inverting pulse width of 5 μsec by using a niobium oxide target (trade name: NBO target, manufactured by AGC Ceramics Co., Ltd.) while introducing a mixed gas having an argon gas mixed with 10 vol % of an oxygen gas into a chamber, thereby forming a high refractive index layer having a thickness of 13 nm and containing niobium oxide as a main component (the fourth layer 64 in FIG. 2).

Subsequently, pulse sputtering was conducted under the conditions of a pressure of 0.3 Pa, a frequency of 20 kHz, a deposition power of 3.8 W/cm$^2$, and an inverting pulse width of 5 μsec by using a silicon target (manufactured by AGC Ceramics Co., Ltd.) while introducing a mixed gas having an argon gas mixed with 40 vol % of an oxygen gas into the chamber, thereby forming a low refractive index layer having a thickness of 35 nm and containing silicon oxide as a main component (the third layer 63 in FIG. 2) on the high refractive index layer (the fourth layer 64).

Subsequently, similar to the high refractive index layer (the fourth layer 64), a high refractive index layer having a thickness of 115 nm and containing niobium oxide as a main component (the second layer 62 in FIG. 2) was formed on the low refractive index layer (the third layer 63). Subsequently, similar to the low refractive index layer (the third layer 63), a low refractive index layer having a thickness of 80 nm and containing silicon oxide as a main component (the outermost layer 61 in FIG. 2) was formed on the high refractive index layer (the second layer 62).

Thus, the antireflection layer including two high refractive index layers containing niobium oxide as a main component and two low refractive index layers containing silicon oxide as a main component, i.e., four layers in total, was formed.

(6) Formation of Antifouling Layer (AFP Layer)

Subsequently, an antifouling layer was deposited by the following method. Using the glass substrate in the state that the glass substrate was stuck to the carrier substrate, the antifouling layer was also efficiently deposited on the side face simultaneously with the deposition on the first main surface having been subjected to the antiglare treatment. When depositing the antifouling layer, an apparatus same as the apparatus shown in FIG. 6 was used. First of all, a material for forming a fluorine-containing organosilicon compound film was introduced as a material of the antifouling layer into a heating vessel. The inside of the heating vessel was then deaerated with a vacuum pump for 10 hours or more to remove the solvent in the solution, thereby obtaining a composition for forming a fluorine-containing organosilicon compound film (hereinafter referred to as "antifouling layer forming composition"). KY-185 (manufactured by Shin-Etsu Chemical Co., Ltd.) was used as the antifouling layer forming composition.

Subsequently, the heating vessel containing the above-described antifouling layer forming composition therein was heated to 270° C. After reaching 270° C., it was maintained for 10 minutes until the temperature was stabilized. Subsequently, the glass substrate having the antireflection layer formed thereon was placed in a vacuum chamber, and the antifouling layer forming composition was supplied toward the antireflection layer on the glass plate from a manifold connected to the heating vessel containing the above-described antifouling layer forming composition therein, followed by conducting deposition.

The deposition was conducted while measuring a thickness by a crystal oscillator monitor placed in the vacuum chamber and was conducted until the thickness of the fluorine-containing organosilicon compound film on the antireflection layer reached 4 nm. Subsequently, the glass substrate taken out of the vacuum chamber was placed on a hotplate such that the fluorine-containing organosilicon compound film surface faced upward, followed by heat-treating in the air at 150° C. for 60 minutes.

(Case 2)

A glass laminate in Case 2 was formed under the same conditions as in Case 1, except for the holding method of the glass substrate during forming the antireflection layer and the antifouling layer as well as the formation method of the antireflection layer.

First of all, prior to forming the antireflection layer, the surface (second main surface) of the glass substrate having the black print layer was laminated with a resin-made carrier substrate having an acrylic pressure-sensitive adhesive adhered thereto. The pressure-sensitive adhesive is adhered to the entire surface of one main surface of the resin-made carrier substrate. In addition, the lamination was conducted in such a manner that the pressure-sensitive adhesive was exposed by 10 mm from the outer periphery of each of the sides of the glass substrate. A polyethylene terephthalate (PET) film (trade name: RP-207, manufactured by Nitto Denko Corporation) was used as the resin-made carrier substrate. In Case 2, the area of the exposed part of the pressure-sensitive adhesive is 22.4 area % relative to the area of the first main surface of the glass substrate.

An antireflection layer was formed under the same conditions as in Case 1, except that the glass substrate having the resin-made carrier substrate laminated thereon was accommodated in the chamber; and that the deposition power when forming the second layer and the fourth layer was 1.0 W/cm$^2$.

(Case 3)

A glass laminate in Case 3 was formed under the same conditions as in Case 1, except that in the holding method of the glass substrate during forming the antireflection layer and the antifouling layer, a resin-made carrier substrate having a polyurethane-based pressure-sensitive adhesive adhered thereto (PET film: UA-3000AS, manufactured by Sumiron Co., Ltd.) was used as the carrier substrate; and that the area of the exposed portion of the pressure-sensitive adhesive was 34.5 area % relative to the area of the first main surface of the glass substrate.

(Case 4)

A glass laminate in Case 4 was formed under the same conditions as in Case 2, except for using three high refractive index layers and three low refractive index layers and changing the thickness of each layer. The thicknesses of the sixth, fourth, and second layers that are the high refractive index layers were 13 nm, 22 nm, and 25 nm, respectively, and the thicknesses of the fifth and third layers and the outermost layer that are the low refractive index layers were 45 nm, 27 nm, and 88 nm, respectively. The deposition power for the high refractive index layers was same as that for the low refractive index layers.

(Case 5)

A glass laminate in Case 5 was formed under the same conditions as in Case 2, except for using five high refractive index layers and five low refractive index layers and changing the thickness of each layer. The thicknesses of the tenth, eighth, sixth, fourth, and second layers that are the high refractive index layers were 13 nm, 110 nm, 10 nm, 10 nm, and 100 nm, respectively, and the thicknesses of the ninth, seventh, fifth, and third layers and the outermost layer that are the low refractive index layers were 32 nm, 32 nm, 97 nm, 25 nm, and 77 nm, respectively. The deposition power for the high refractive index layers was same as that for the low refractive index layers.

(Case 6)

A glass laminate in Case 6 was formed under the same conditions as in Case 4, except that the glass substrate was not chemically strengthened; and that the main component of the low refractive index layer and the deposition power during forming the high refractive index layer were changed. The main component of the outermost layer, the third layer, and the fifth layer that are the low refractive index layers was aluminum-doped silicon oxide. For forming the low refractive index layer containing this aluminum-doped silicon oxide as the main component, a silicon target having 10 mass % of aluminum added thereto (manufactured by Soleras Advanced Coatings Ltd.) was used.

The deposition power for the high refractive index layers was 1.5 W/cm$^2$.

(Case 7)

A glass laminate in Case 7 was formed under the same conditions as in Case 4, except that the antiglare treatment was not conducted. In addition, the deposition power for the high refractive index layers was 1.5 W/cm$^2$.

(Case 8)

A glass laminate in Case 8 was formed under the same conditions as in Case 4, except that the antifouling layer was not formed. In addition, the deposition power for the high refractive index layers was 1.5 W/cm$^2$.

(Case 9)

A glass laminate in Case 9 was formed under the same conditions as in Case 2, except that Al—SiO$_2$ was used as the main component of the material constituting the low refractive index layers in place of $SiO_2$.
(Case 10)
A glass laminate in Case 10 was formed under the same conditions as in Case 2, except that the antireflection layer was formed from two layers in total of one high refractive index layer and one low refractive index layer.
(Case 11)
A glass laminate in Case 11 was formed under the same conditions as in Case 2, except that the antireflection layer was formed by equally setting the deposition power for all of the low refractive index layers to 3.8 W/cm$^2$.
(Case 12)
A glass laminate in Case 12 was formed under the same conditions as in Case 4, except that the antireflection layer was formed by equally setting the deposition power for all of the low refractive index layers to 3.8 W/cm$^2$.
(Case 13)
A glass laminate in Case 13 was formed under the same conditions as in Case 4, except that in the second layer, the fourth layer, and the sixth layer, the deposition power was reduced to 0.3 W/cm$^2$.
[Evaluation of Glass Laminate]
The glass laminates obtained in Cases 1 to 13 were evaluated as follows.
(Measurement of Carbon Concentration in the Outermost Layer and the Second Layer)
First of all, the antifouling layer formed in the glass laminate and surface organic contamination are removed. For the removal, an oxygen plasma treatment was carried out, and an ultraviolet (UV) ozone treatment was then carried out. Any one of those treatments may be carried out depending on the thickness of the antifouling layer and the degree of surface contamination.

A low-temperature asher (LTA-102 Model, manufactured by Yanaco Co., Ltd.) was used in the oxygen plasma treatment. The treatment conditions were as follows: high-frequency output: 50 W, oxygen flow rate: 50 mL/min, and treatment time: 60 minutes.

In the UV ozone treatment, an ultraviolet irradiation device PL30-200 (manufactured by Sen Engineering Co., Ltd.) was used, and UB2001D-20 was used as a power source of the ultraviolet irradiation device. The treatment conditions were as follows: ultraviolet ray wavelength: 254 nm and treatment time: 10 minutes.

By confirming with the X-ray photoelectron spectroscopy that a peak of fluorine is not present in the glass laminate after completion of the UV ozone treatment, it was confirmed that the antifouling layer on the surface had been removed.

Subsequently, the carbon amount of the outermost layer and the second layer of the glass laminate is measured with SIMS (secondary ion mass spectrometer) in accordance with the following procedures.

(a) First of all, a reference sample having a known carbon concentration is prepared by means of ion implantation. A substrate having the same composition as a film to be evaluated or a substrate having the film deposited thereon is prepared separately from a sample to be evaluated. The reference sample to be prepared is preferably one having a low carbon concentration as possible. Here, a quartz glass substrate was prepared for $SiO_2$ film evaluation, and a substrate in which a 420 nm-thick $Nb_2O_5$ film had been deposited on Dragontrail was prepared for $Nb_2O_5$ film evaluation.

For the ion implantation, IMX-3500RS (manufactured by ULVAC, Ltd.) was used. For the $SiO_2$ film evaluation, a $^{12}C$ ion is implanted into the quartz substrate with an energy of 110 keV. The $^{12}C$ ion implantation amount is 1.5×10$^{15}$ ions/cm$^2$. In addition, for the $Nb_2O_5$ film evaluation, a $^{12}C$ ion is implanted into the Dragontrail having the $Nb_2O_5$ film deposited thereon with an energy of 65 keV. The $^{12}C$ ion implantation amount is 1.2×10$^{15}$ ions/cm$^2$.

(b) Subsequently, the sample to be evaluated and the reference sample having a known carbon concentration, which is prepared in the above (a), are simultaneously conveyed into the SIMS apparatus and measured in order, and profiles in a depth direction of intensity of $^{12}C^-$ and $^{30}Si^-$ as well as $(^{93}Nb+^{16}O)^-$ are obtained. A relative sensitivity factor (RSF) is determined from the profiles in a depth direction of the reference sample, and a profile of the carbon concentration of the measurement sample is obtained using the determined RSF. On this occasion, for the $SiO_2$ film evaluation, the profile of the carbon concentration of the measurement sample using RSF of the quartz glass substrate having a $^{12}C$ ion implanted thereinto is used, and for the $Nb_2O_5$ film evaluation, the profile of the carbon concentration of the measurement sample using RSF of the $Nb_2O_5$ film on the Dragontrail having a $^{12}C$ ion implanted thereinto is used, respectively.

SIMS is measured using ADEPT1010 (manufactured by ULVAC-PHI, Inc.). The measurement conditions of SIMS are as follows: primary ion species: Cs$^+$, accelerating voltage: 5 kV, current value: 50 nA, incident angle: 60° with respect to normal line of sample face, and luster size of primary ion: 400×400 µm$^2$, and primary ion irradiation is conducted under the foregoing conditions. Regarding the detection of a secondary ion, the secondary ion having minus polarity is detected under the conditions that detection range is 80×80 µm$^2$ (4% of luster size of primary ion), and a field aperture of the detector is set to 1. On this occasion, a neutralizer is used. In order to ensure measurement accuracy, it is preferred that the inside of the apparatus is made in a high vacuum state as possible. The main chamber before initiation of measurement of SIMS had a degree of vacuum of 1.6×10$^{-7}$ Pa.

A sputtering (irradiation) rate of the primary ion relative to the quartz glass substrate having a $^{12}C$ ion implanted thereinto was 0.30 nm/sec, and a sputtering (irradiation) rate of the primary ion relative to the $Nb_2O_5$ film on the Dragontrail having a $^{12}C$ ion implanted thereinto was 0.35 nm/sec. Similar to the degree of vacuum of the apparatus, in order to ensure measurement accuracy, it is preferred to conduct under the conditions of a high sputtering rate as possible.

Subsequently, the abscissa of the profile of the carbon concentration of the measurement sample obtained in (b) is converted from the sputtering time to the depth as follows. A depth of a concave (crater) of each of the analyzed reference samples is determined by a stylus type surface shape measuring instrument (Dektak 150, manufactured by Veeco Instruments, Inc.), and the sputtering rate of the primary ion relative to the reference sample is determined. Using the sputtering rate of the quartz glass substrate having a $^{12}C$ ion implanted thereinto for the $SiO_2$ film evaluation and the sputtering rate of the $Nb_2O_5$ film on the Dragontrail having a $^{12}C$ ion implanted thereinto for the $Nb_2O_5$ film evaluation, respectively, the abscissa is converted from the sputtering time to the depth.

Subsequently, the carbon concentrations of the outermost layer and the second layer are calculated from the profiles of the carbon concentration of the measurement sample in which the abscissa has been converted to the depth in the above manner.

First of all, in calculating the carbon concentration in the $SiO_2$ film of the outermost layer, a profile in which the abscissa is converted from the sputtering time to the depth using the sputtering rate of the quartz glass substrate having a $^{12}C$ ion implanted thereinto, and the ordinate is converted from the secondary ion intensity to the concentration using RSF of the quartz glass substrate having a $^{12}C$ ion implanted thereinto is prepared. The thus obtained C concentration profile is effective for C in the $SiO_2$ film. Adsorbed carbon is present in the outermost layer, and this adsorbed carbon is measured in the measurement by SIMS. An average carbon concentration in a region that is not only a retention region where the $^{30}Si^-$ secondary ion intensity remains on the same level, exclusive of the region where this adsorbed carbon is measured, but also a region up to the initiation of an increase of the secondary ion intensity of Nb measured in the layer on the side of the glass substrate, was defined as the carbon concentration. Thus, with respect to each of the samples, the average carbon concentration was measured three times, and an average value thereof was defined as the carbon (C) atom concentration in the $SiO_2$ film. The results are shown in Tables 1 to 4.

Subsequently, in calculating the carbon concentration in the $Nb_2O_5$ film of the second layer, similar to the case in the $SiO_2$ film, a profile in which the abscissa is converted from the sputtering time to the depth using the sputtering rate of the $Nb_2O_5$ film on the Dragontrail having a $^{12}C$ ion implanted thereinto, and the ordinate is converted from the secondary ion intensity to the concentration using RSF of the $Nb_2O_5$ film on the Dragontrail having a $^{12}C$ ion implanted thereinto is prepared. The thus obtained C concentration profile is effective for C in the $Nb_2O_5$ film. An average carbon concentration in a region that is not only a retention region where the $(^{93}Nb+^{16}O)^-$ secondary ion intensity remains on the same level but also a region up to the initiation of an increase of the secondary ion intensity of $^{30}Si^-$ measured in the layer on the side of the glass substrate was defined as the carbon concentration. Thus, with respect to each of the samples, the average carbon concentration was measured three times, and an average value thereof was defined as the carbon (C) atom concentration in the $Nb_2O_5$ film. The results are shown in Tables 1 to 4.

(Measurement of Water Contact Angle)

A water droplet of about 1 µL of pure water was subjected to drop adhesion on the surface (first main surface) of the glass laminate on the side on which the antifouling layer was formed, and a contact angle against water was measured with, as a contact angle meter, a device name: DM-501, manufactured by Kyowa Interface Science, Inc. The water contact angle was measured in ten places on the surface of the antifouling layer, and an average thereof was calculated and evaluated. The results are shown in Tables 1 to 4.

(Measurement of Water Contact Angle after Rubbing 50,000 Times)

First of all, the surface of a flat metal indenter having a bottom surface of 10 mm×10 mm was covered with a plain-woven cotton fabric Kanakin No. 3 to prepare an abrader for rubbing the sample. Subsequently, using the above-described abrader, an abrasion test was carried out by means of a plane abrasion tester (3 Arm-type) (manufactured by DAIEI KAGAKU SEIKI MFG. Co., Ltd.). Specifically, the above-described abrader was first installed in the abrasion tester such that the bottom surface of the indenter was in contact with the surface of the antifouling film of the sample, and a weight was mounted such that a weight of 1,000 g was exerted to the abrader, whereupon the abrader was reciprocated for a distance of 40 mm each way at an average speed of 6,400 mm/min. The test was carried out by taking one reciprocation as two abrasion operations. A water contact angle on the surface of the antifouling layer after completion of rubbing 50,000 times was measured in the same manner as described above. The results: are shown in Tables 1 to 4.

(Measurement of Scratch Rubbing Resistance)

The antireflection layer was scratched with a cutter. Subsequently, a wiper (trade name: SHELLPER, manufactured by Ozu Corporation) was wound on an indenter of 1 $cm^2$, and the glass laminate was rubbed with the wiper at a speed of 50 mm/sec and a stroke of 40 mm for 1 minute while applying a load of 20N. After the rubbing test, occurrence of peeling of the film at the vicinity of scratches was confirmed with a microscope at a magnification of 100 times. The results are shown in Tables 1 to 4. In Tables 1 to 4, the state that the film is not peeled is indicated by "OK", and the state that the film is peeled is indicated by "NG".

The information of each treatment and evaluation results for the glass laminates in Cases 1 to 13 are shown in Tables 1 to 4. In the columns of the "antiglare treatment" and the "chemical strengthening treatment" in Tables 1 to 4, the case where the treatment was conducted is shown by "Done", and the case where the treatment was not conducted is shown by "None".

TABLE 1

|  |  | Case 1 | Case 2 | Case 3 | Case 4 |
|---|---|---|---|---|---|
| Glass substrate | Kind | DT | DT | DT | DT |
|  | Thickness | 1.3 mm | 1.3 mm | 1.3 mm | 1.3 mm |
| Antiglare treatment |  | Done | Done | Done | Done |
| Chemical strengthening treatment |  | Done | Done | Done | Done |
| Antireflection layer, Thickness, Deposition power |  | 4th layer:<br>$Nb_2O_5$, 13 nm,<br>1.5 $W/cm^2$<br>3rd layer:<br>$SiO_2$, 35 nm,<br>3.8 $W/cm^2$<br>2nd layer:<br>$Nb_2O_5$, 115 nm,<br>1.5 $W/cm^2$<br>Outermost layer:<br>$SiO_2$, 80 nm,<br>3.8 $W/cm^2$<br>— | 4th layer:<br>$Nb_2O_5$, 13 nm,<br>1 $W/cm^2$<br>3rd layer:<br>$SiO_2$, 35 nm,<br>3.8 $W/cm^2$<br>2nd layer:<br>$Nb_2O_5$, 115 nm,<br>1 $W/cm^2$<br>Outermost layer:<br>$SiO_2$, 80 nm,<br>3.8 $W/cm^2$<br>— | 4th layer:<br>$Nb_2O_5$, 13 nm,<br>1.5 $W/cm^2$<br>3rd layer:<br>$SiO_2$, 35 nm,<br>3.8 $W/cm^2$<br>2nd layer:<br>$Nb_2O_5$, 115 nm,<br>1.5 $W/cm^2$<br>Outermost layer:<br>$SiO_2$, 80 nm,<br>3.8 $W/cm^2$<br>— | 6th layer:<br>$Nb_2O_5$, 13 nm,<br>1 $W/cm^2$<br>5th layer:<br>$SiO_2$, 45 nm,<br>3.8 $W/cm^2$<br>4th layer:<br>$Nb_2O_5$, 22 nm,<br>1 $W/cm^2$<br>3rd layer:<br>$SiO_2$, 27 nm,<br>3.8 $W/cm^2$<br>2nd layer:<br>$Nb_2O_5$, 25 nm,<br>1 $W/cm^2$ |

TABLE 1-continued

|  |  | Case 1 | Case 2 | Case 3 | Case 4 |
|---|---|---|---|---|---|
|  |  | — | — | — | Outermost layer: $SiO_2$, 88 nm, 3.8 W/cm² |
|  |  | — | — | — | — |
|  |  | — | — | — | — |
|  |  | — | — | — | — |
| Antifouling layer | Material | KY-185, manufactured by Shin-Etsu Chemical Co., Ltd | KY-185, manufactured by Shin-Etsu Chemical Co., Ltd | KY-185, manufactured by Shin-Etsu Chemical Co., Ltd | KY-185, manufactured by Shin-Etsu Chemical Co., Ltd |
|  | Thickness | 4 nm | 4 nm | 4 nm | 4 nm |
| Holding method of glass substrate | Carrier substrate | Glass substrate | PET film | PET film | PET film |
|  | Pressure-sensitive adhesive | Silicone-based adhesive-attached polyimide tape | Acrylic pressure-sensitive adhesive | Polyurethane-based pressure-sensitive adhesive | Acrylic pressure-sensitive adhesive |
|  | Exposed width of pressure-sensitive adhesive (mm) | 2 | 10 | 10 | 10 |
|  | Area % of pressure-sensitive adhesive | 5 | 22.4 | 34.5 | 22.4 |
| Carbon concentration | Carbon concentration of outermost layer (×10¹⁸ atoms/cm³) | 20 | 37 | 60 | 40 |
|  | Carbon concentration of 2nd layer (×10¹⁸ atoms/cm³) | 8 | 11 | 34 | 16 |
| Water contact angle (°) |  | 112 | 113 | 110 | 114 |
| Water contact angle after rubbing 50,000 times (°) |  | 106 | 105 | 102 | 100 |
| Scratch rubbing resistance |  | OK | OK | OK | OK |

TABLE 2

|  |  | Case 5 | Case 6 | Case 7 |
|---|---|---|---|---|
| Glass substrate | Kind | DT | DT | DT |
|  | Thickness | 1.3 mm | 1.3 mm | 1.3 mm |
| Antiglare treatment |  | Done | Done | None |
| Chemical strengthening treatment |  | Done | None | Done |
| Antireflection layer, Thickness, Deposition power |  | 10th layer: $Nb_2O_5$, 13 nm, 1 W/cm² <br> 9th layer: $SiO_2$, 32 nm, 3.8 W/cm² <br> 8th layer: $Nb_2O_5$, 110 nm, 1 W/cm² <br> 7th layer: $SiO_2$, 32 nm, 3.8 W/cm² <br> 6th layer: $Nb_2O_5$, 10 nm, 1 W/cm² <br> 5th layer: $SiO_2$, 97 nm, 3.8 W/cm² <br> 4th layer: $Nb_2O_5$, 10 nm, 1 W/cm² <br> 3rd layer: $SiO_2$, 25 nm, 3.8 W/cm² <br> 2nd layer: $Nb_2O_5$, 100 nm, 1 W/cm² <br> Outermost layer: $SiO_2$, 77 nm, 3.8 W/cm² | 6th layer: $Nb_2O_5$, 13 nm, 1.5 W/cm² <br> 5th layer: Al—$SiO_2$, 45 nm, 3.8 W/cm² <br> 4th layer: $Nb_2O_5$, 22 nm, 1.5 W/cm² <br> 3rd layer: Al—$SiO_2$, 27 nm, 3.8 W/cm² <br> 2nd layer: $Nb_2O_5$, 25 nm, 1.5 W/cm² <br> Outermost layer: Al—$SiO_2$, 88 nm, 3.8 W/cm² <br> — <br> — <br> — <br> — | 6th layer: $Nb_2O_5$, 13 nm, 1.5 W/cm² <br> 5th layer: $SiO_2$, 45 nm, 3.8 W/cm² <br> 4th layer: $Nb_2O_5$, 22 nm, 1.5 W/cm² <br> 3rd layer: $SiO_2$, 27 nm, 3.8 W/cm² <br> 2nd layer: $Nb_2O_5$, 25 nm, 1.5 W/cm² <br> Outermost layer: $SiO_2$, 88 nm, 3.8 W/cm² <br> — <br> — <br> — <br> — |
| Antifouling layer | Material | KY-185, manufactured by Shin-Etsu Chemical Co., Ltd | KY-185, manufactured by Shin-Etsu Chemical Co., Ltd | KY-185, manufactured by Shin-Etsu Chemical Co., Ltd |
|  | Thickness | 4 nm | 4 nm | 4 nm |
| Holding method of glass substrate | Carrier substrate | PET film | PET film | PET film |
|  | Pressure-sensitive adhesive | Acrylic pressure-sensitive adhesive | Acrylic pressure-sensitive adhesive | Acrylic pressure-sensitive adhesive |
|  | Exposed width of pressure-sensitive adhesive (mm) | 10 | 10 | 10 |

TABLE 2-continued

|  |  | Case 5 | Case 6 | Case 7 |
|---|---|---|---|---|
|  | Area % of pressure-sensitive adhesive | 22.4 | 22.4 | 22.4 |
| Carbon concentration | Carbon concentration of outermost layer (×$10^{18}$ atoms/cm$^3$) | 43 | 42 | 41 |
|  | Carbon concentration of 2nd layer (×$10^{18}$ atoms/cm$^3$) | 21 | 25 | 25 |
| Water contact angle (°) |  | 114 | 114 | 114 |
| Water contact angle after rubbing 50,000 times (°) |  | 100 | 100 | 100 |
| Scratch rubbing resistance |  | OK | OK | OK |

TABLE 3

|  |  | Case 8 | Case 9 | Case 10 |
|---|---|---|---|---|
| Glass substrate | Kind | DT | DT | DT |
|  | Thickness | 1.3 mm | 1.3 mm | 1.3 mm |
| Antiglare treatment |  | Done | Done | Done |
| Chemical strengthening treatment |  | Done | Done | Done |
| Antireflection layer, Thickness, Deposition power |  | 6th layer: $Nb_2O_5$, 13 nm, 1.5 W/cm$^2$ | 4th layer: $Nb_2O_5$, 13 nm, 1 W/cm$^2$ | 2nd layer: $Nb_2O_5$, 115 nm, 1 W/cm$^2$ |
|  |  | 5th layer: $SiO_2$, 45 nm, 3.8 W/cm$^2$ | 3rd layer: Al—$SiO_2$, 35 nm, 3.8 W/cm$^2$ | Outermost layer: $SiO_2$, 80 nm, 3.8 W/cm$^2$ |
|  |  | 4th layer: $Nb_2O_5$, 22 nm, 1.5 W/cm$^2$ | 2nd layer: $Nb_2O_5$, 115 nm, 1 W/cm$^2$ | — |
|  |  | 3rd layer: $SiO_2$, 27 nm, 3.8 W/cm$^2$ | Outermost layer: Al—$SiO_2$, 80 nm, 3.8 W/cm$^2$ | — |
|  |  | 2nd layer: $Nb_2O_5$, 25 nm, 1.5 W/cm$^2$ | — | — |
|  |  | Outermost layer: $SiO_2$, 88 nm, 3.8 W/cm$^2$ | — | — |
|  |  | — | — | — |
|  |  | — | — | — |
| Antifouling layer | Material | Nil | KY-185, manufactured by Shin-Etsu Chemical Co., Ltd | KY-185, manufactured by Shin-Etsu Chemical Co., Ltd |
|  | Thickness | 0 nm | 4 nm | 4 nm |
| Holding method of glass substrate | Carrier substrate | PET film | PET film | PET film |
|  | Pressure-sensitive adhesive | Acrylic pressure-sensitive adhesive | Acrylic pressure-sensitive adhesive | Acrylic pressure-sensitive adhesive |
|  | Exposed width of pressure-sensitive adhesive (mm) | 10 | 10 | 10 |
|  | Area % of pressure-sensitive adhesive | 22.4 | 22.4 | 22.4 |
| Carbon concentration | Carbon concentration of outermost layer (×$10^{18}$ atoms/cm$^3$) | 41 | 37 | 8 |
|  | Carbon concentration of 2nd layer (×$10^{18}$ atoms/cm$^3$) | 17 | 10 | 6 |
| Water contact angle (°) |  | — | 113 | 113 |
| Water contact angle after rubbing 50,000 times (°) |  | — | 103 | 103 |
| Scratch rubbing resistance |  | OK | OK | OK |

TABLE 4

|  |  | Case 11 | Case 12 | Case 13 |
|---|---|---|---|---|
| Glass substrate | Kind | DT | DT | DT |
|  | Thickness | 1.3 mm | 1.3 mm | 1.3 mm |
| Antiglare treatment |  | Done | Done | Done |
| Chemical strengthening treatment |  | Done | Done | Done |
| Antireflection layer, Thickness, Deposition power |  | 4th layer: $Nb_2O_5$, 13 nm, | 6th layer: $Nb_2O_5$, 13 nm, | 6th layer: $Nb_2O_5$, 13 nm, |

TABLE 4-continued

|  |  | Case 11 | Case 12 | Case 13 |
|---|---|---|---|---|
|  |  | 3.8 W/cm² | 3.8 W/cm² | 0.3 W/cm² |
|  |  | 3rd layer: | 5th layer: | 5th layer: |
|  |  | SiO₂, 35 nm, | SiO₂, 45 nm, | SiO₂, 45 nm, |
|  |  | 3.8 W/cm² | 3.8 W/cm² | 3.8 W/cm² |
|  |  | 2nd layer: | 4th layer: | 4th layer: |
|  |  | Nb₂O₅, 115 nm, | Nb₂O₅, 22 nm, | Nb₂O₅, 22 nm, |
|  |  | 3.8 W/cm² | 3.8 W/cm² | 0.3 W/cm² |
|  |  | Outermost layer: | 3rd layer: | 3rd layer: |
|  |  | SiO₂, 80 nm, | SiO₂, 27 nm, | SiO₂, 27 nm, |
|  |  | 3.8 W/cm² | 3.8 W/cm² | 3.8 W/cm² |
|  |  | — | 2nd layer: | 2nd layer: |
|  |  |  | Nb₂O₅, 25 nm, | Nb₂O₅, 25 nm, |
|  |  |  | 3.8 W/cm² | 0.3 W/cm² |
|  |  | — | Outermost layer: | Outermost layer: |
|  |  |  | SiO₂, 88 nm, | SiO₂, 88 nm, |
|  |  |  | 3.8 W/cm² | 3.8 W/cm² |
|  |  | — | — | — |
|  |  | — | — | — |
|  |  | — | — | — |
| Antifouling layer | Material | KY-185, manufactured by Shin-Etsu Chemical Co., Ltd | KY-185, manufactured by Shin-Etsu Chemical Co., Ltd | KY-185, manufactured by Shin-Etsu Chemical Co., Ltd |
|  | Thickness | 4 nm | 4 nm | 4 nm |
| Holding method of glass substrate | Carrier substrate | PET film | PET film | PET film |
|  | pressure-sensitive adhesive | Acrylic pressure-sensitive adhesive | Acrylic pressure-sensitive adhesive | Acrylic pressure-sensitive adhesive |
|  | Exposed width of pressure-sensitive adhesive (mm) | 10 | 10 | 10 |
|  | Area % of pressure-sensitive adhesive | 22.4 | 22.4 | 22.4 |
| Carbon concentration | Carbon concentration of outermost layer (×10¹⁸ atoms/cm³) | 35 | 46 | 40 |
|  | Carbon concentration of 2nd layer (×10¹⁸ atoms/cm³) | 45 | 72 | 2 |
| Water contact angle (°) |  | 113 | 114 | 114 |
| Water contact angle after rubbing 50,000 times (°) |  | 103 | 102 | 102 |
| Scratch rubbing resistance |  | NG | NG | NG |

As shown in Tables 1 to 3, in the glass laminates of Cases 1 to 10, it was confirmed that the carbon concentration of the second layer by SIMS was $3\times10^{18}$ to $5\times10^{19}$ atoms/cm³, and it was confirmed that the carbon concentration of the outermost layer by SIMS was $5\times10^{18}$ to $6\times10^{19}$ atoms/cm³. As is found from Cases 1 to 10, the carbon concentration of the second layer is smaller than the carbon concentration of the outermost layer. On the other hand, in the glass laminate of Case 11, it was confirmed that the carbon concentration of the second layer by SIMS was $4.5\times10^{19}$ atoms/cm³, and that the carbon concentration of the outermost layer by SIMS was $3.5\times10^{19}$ atoms/cm³. Similarly, in the glass laminate of Case 12, it was confirmed that the carbon concentration of the second layer by SIMS was $7.2\times10^{19}$ atoms/cm³, and that the carbon concentration of the outermost layer by SIMS was $4.6\times10^{19}$ atoms/cm³. In Cases 11 and 12, the carbon concentration of the second layer is larger than the carbon concentration of the outermost layer. In the glass laminate of Case 13, it was confirmed that the carbon concentration of the second layer by SIMS was $2.0\times10^{18}$ atoms/cm³, and that the carbon concentration of the outermost layer by SIMS was $4.0\times10^{19}$ atoms/cm³.

The carbon concentration of the second layer in Case 13 is lower than the carbon concentration of the second layer of each of Cases 1 to 10.

In the measurement of the scratch rubbing resistance, peeling of the film did not occur in Cases 1 to 10, and the evaluation was "OK", whereas peeling of the film occurred in Cases 11 and 13, and the evaluation was "NG". That is, in the case of not only regulating the carbon concentration of the second layer in the antireflection layer to $3\times10^{18}$ atoms/cm³ or more and $5\times10^{19}$ atoms/cm³ or less but also making the carbon concentration of the second layer in the antireflection layer lower than the carbon concentration of the outermost layer, even if the outermost layer is scratched, the propagation of the scratches up to the second layer is prevented, so that the durability of the antireflection layer is improved.

It is found that among the glass laminates of Cases 1 to 10, those of Cases 1 to 7, 9, and 10 in which the antifouling layer is formed are large with respect to the water contact angle and exhibit excellent antifouling property.

In addition, it is found that the glass laminates of Cases 1 to 7, 9, and 10 are small in a decrease of the water contact angle after rubbing 50,000 times as compared with the initial value and exhibit excellent abrasion resistance of the antifouling layer.

On the other hand, in the glass laminates of Cases 11 to 13, the following requirements regarding the carbon concentration of the second layer by SIMS are not satisfied: the carbon concentration of the second layer is $3\times10^{18}$ atoms/cm³ or more and $5\times10^{19}$ atoms/cm³ or less; and/or that the carbon concentration of the second layer is lower than the carbon concentration of the outermost layer. Thus, after rubbing 50,000 times, the water contact angle is decreased as compared with the initial value, and therefore, it is found that the abrasion resistance of the antifouling layer is inferior.

When the present invention are described in detail and with reference to specific embodiments thereof, it is apparent to one skilled in the art that various changes and modifications may be made therein without departing from the spirit and scope thereof.

1: Glass laminate
2: First main surface
3: Second main surface
4: Edge surface
5: Glass substrate
6: Antireflection layer (functional layer)
61: Outermost layer
62: Second layer
7: Antifouling layer
8: Print layer
9: Pressure-sensitive adhesive
10: Carrier substrate

The invention claimed is:

1. A glass laminate, comprising:
a glass substrate including a first main surface and a second main surface; and
a functional layer at least on the first main surface, the functional layer including at least two layers having a refractive index different from each other, the at least two layers being alternately laminated,
wherein the functional layer includes an outermost layer farthest from the glass substrate, the outermost layer including $SiO_2$ as a main component, and
the functional layer includes a second layer that is adjacent to the outermost layer and lies closer to the glass substrate than the outermost layer, the second layer having a carbon concentration of $3 \times 10^{18}$ atoms/cm$^3$ or more and $5 \times 10^{19}$ atoms/cm$^3$ or less, and the carbon concentration of the second layer is lower than a carbon concentration of the outermost layer.

2. The glass laminate according to claim 1, wherein the functional layer includes at least one low refractive index layer and at least one high refractive index layer having a refractive index higher than the low refractive index layer, and the layer number of the low refractive index layer is 1 or more and 6 or less and the layer number of the high refractive index layer is same as the layer number of the low refractive index layer.

3. The glass laminate according to claim 2, wherein the layer number of each of the low refractive index layer and the high refractive index layer is 1,
the outermost layer is the low refractive index layer, and
the high refractive index layer includes, as a main component, any one of SiN, $TiO_2$, $Nb_2O_5$, $Ta_2O_5$, and $ZrO_2$.

4. The glass laminate according to claim 2, wherein the layer number of each of the low refractive index layer and the high refractive index layer is 2 or more and 6 or less, the outermost layer is one layer of the low refractive index layers,
each of the high refractive index layers includes, as a main component, any one of SiN, $TiO_2$, $Nb_2O_5$, $Ta_2O_5$, and $ZrO_2$, and
the main component of all of the high refractive index layers is the same, or the main component of at least one layer of the high refractive index layers is different from the main component of the other high refractive index layer(s).

5. The glass laminate according to claim 1, further comprising an antifouling layer on the outermost layer.

6. The glass laminate according to claim 5, wherein the antifouling layer is formed of a fluorine-based silane coupling material.

7. The glass laminate according to claim 5, wherein the carbon concentration of the outermost layer is $5 \times 10^{18}$ atoms/cm$^3$ or more and $6 \times 10^{19}$ atoms/cm$^3$ or less.

8. The glass laminate according to claim 1, wherein the first main surface of the glass substrate has an antiglare layer.

9. The glass laminate according to claim 1, wherein the functional layer includes a main surface that does not face the glass substrate, the main surface having a concave-convex shape, and
the concave-convex shape has a root mean square roughness (RMS) of 10 nm or more and 1,000 nm or less.

10. The glass laminate according to claim 1, wherein the outermost layer includes Al—$SiO_2$.

11. A front plate for display, comprising the glass laminate according to claim 1.

12. A display device, comprising the front plate for display according to claim 11.

* * * * *